US010652868B2

(12) United States Patent
Shimomura et al.

(10) Patent No.: US 10,652,868 B2
(45) Date of Patent: May 12, 2020

(54) TERMINAL APPARATUS, BASE STATION APPARATUS, AND WIRELESS COMMUNICATION METHOD

(71) Applicant: FUJITSU LIMITED, Kawasaki-shi, Kanagawa (JP)

(72) Inventors: Tsuyoshi Shimomura, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/217,761

(22) Filed: Dec. 12, 2018

(65) Prior Publication Data

US 2019/0116589 A1 Apr. 18, 2019

Related U.S. Application Data

(63) Continuation of application No. PCT/JP2017/017039, filed on Apr. 28, 2017.

(51) Int. Cl.
H04W 72/04 (2009.01)
H04L 5/00 (2006.01)
(Continued)

(52) U.S. Cl.
CPC ........... *H04W 72/0413* (2013.01); *H04L 1/16* (2013.01); *H04L 1/1861* (2013.01); *H04L 1/1874* (2013.01); *H04L 5/0048* (2013.01); *H04L 5/0055* (2013.01); *H04W 72/1242* (2013.01); *H04W 72/1284* (2013.01); *H04L 5/0007* (2013.01)

(58) Field of Classification Search
None
See application file for complete search history.

(56) References Cited

U.S. PATENT DOCUMENTS

2002/0094817 A1* 7/2002 Rune ..................... H04W 92/22
455/450
2009/0109917 A1 4/2009 Pajukoski et al.
(Continued)

FOREIGN PATENT DOCUMENTS

EP 2 077 677 A1 7/2009
EP 2 592 776 A1 5/2013
(Continued)

OTHER PUBLICATIONS

Dahlman et al., "4G: LTE/LTE-Advanced for Mobile Broadband, Second Edition", pp. 193-240 and 267-288, Oct. 29, 2013, Hardcover ISBN: 9780124199859 (Year: 2013).*
(Continued)

*Primary Examiner* — Hassan A Phillips
*Assistant Examiner* — Gautam Sharma
(74) *Attorney, Agent, or Firm* — Myers Wolin, LLC

(57) ABSTRACT

A terminal apparatus includes a receiver configured to receive a radio signal; processor circuitry configured to generate a response signal to respond to the received radio signal; and a transmitter configured to transmit a plurality of types of signals including the generated response signal, wherein a size of a radio resource to be used for transmitting the generated response signal is changed when the plurality of types of signals including the generated response signal are transmitted on one physical uplink control channel (PUCCH) resource.

21 Claims, 31 Drawing Sheets

(51) Int. Cl.
H04W 72/12 (2009.01)
H04L 1/16 (2006.01)
H04L 1/18 (2006.01)

(56) References Cited

U.S. PATENT DOCUMENTS

| | | | |
|---|---|---|---|
| 2009/0109949 A1* | 4/2009 | Wu | H04W 74/00 370/345 |
| 2011/0026417 A1* | 2/2011 | Kishiyama | H04W 52/225 370/252 |
| 2011/0228731 A1 | 9/2011 | Luo et al. | |
| 2012/0002657 A1 | 1/2012 | Seyama et al. | |
| 2012/0176961 A1* | 7/2012 | Horiuchi | H04L 5/0053 370/315 |
| 2012/0195292 A1* | 8/2012 | Ko | H04L 1/0027 370/336 |
| 2012/0266054 A1* | 10/2012 | Ogawa | H04L 5/001 714/807 |
| 2012/0287886 A1* | 11/2012 | Fukuoka | H04L 1/1893 370/329 |
| 2013/0022096 A1* | 1/2013 | Kazmi | H04L 5/0048 375/224 |
| 2013/0028214 A1* | 1/2013 | Imamura | H04L 5/001 370/329 |
| 2013/0188583 A1* | 7/2013 | Lan | H04L 1/1809 370/329 |
| 2013/0286996 A1* | 10/2013 | Takeda | H04L 1/1692 370/329 |
| 2013/0288738 A1* | 10/2013 | Takeda | H04L 1/1825 455/522 |
| 2014/0211737 A1* | 7/2014 | Takeda | H04W 52/146 370/329 |
| 2015/0146677 A1* | 5/2015 | Ito | H04W 4/70 370/329 |
| 2015/0208403 A1 | 7/2015 | Takeda et al. | |
| 2016/0218836 A1 | 7/2016 | Yamamoto et al. | |
| 2017/0366311 A1* | 12/2017 | Iyer | H04B 7/0482 |
| 2018/0323920 A1* | 11/2018 | Zhu | H04L 5/0016 |

FOREIGN PATENT DOCUMENTS

| | | |
|---|---|---|
| JP | 2013-506386 A | 2/2013 |
| JP | 2014-36427 A | 2/2014 |
| WO | 2010/060455 A1 | 6/2010 |
| WO | 2010/109521 A1 | 9/2010 |

OTHER PUBLICATIONS

3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification (Release 14)", Mar. 2017.
Dahlman et al., "4G: LTE/LTE-Advanced for Mobile Broadband, Second Edition", pp. 290-309, Oct. 20, 2015. Cited in ISR for PCT/JP2017/017039, with translation of the relevant part.
Intel Corporation, "Scheduling request design for NR", Agenda Item: 8.1.3.2.6, 3GPP TSG-RAN WG1 Meeting π88bis, R1-1704760, Spokane, USA, Apr. 3-7, 2017, cited in ISR for PCT/JP2017/017039.
Huawei et al., "Discussion on CBG-based feedback and retransmission", Agenda Item: 8.1.3.3.2, 3GPP TSG-RAN WG1 Meeting #88bis, R1-1705066, Spokane, USA, Apr. 3-7, 2017, cited in ISR for PCT/JP2017/017039.
3GPP TS 36.211 V14.2.0, "3rd Generation Partnership Project; Technical Specification Group Radio Access Network; Evolved Universal Terrestrial Radio Access (E-UTRA); Physical channels and modulation (Release 14)", Mar. 2017.
3GPP TS 36.212 V14.2.0, "3rd Generation Partnership Project; Technical Specification Group Radio Access Network; Evolved Universal Terrestrial Radio Access (E-UTRA); Multiplexing and channel coding (Release 14)", Mar. 2017.
3GPP TS 36.213 V14.2.0, "3rd Generation Partnership Project; Technical Specification Group Radio Access Network; Evolved Universal Terrestrial Radio Access (E-UTRA); Physical layer procedures (Release 14)", Mar. 2017.
3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Mar. 2017.
3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification (Release 14)", Mar. 2017.
3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification (Release 14)", Mar. 2017.
3GPP TS 36.323 V14.3.0, "3rd Generation Partnership Project; Technical Specification Group Radio Access Network; Evolved Universal Terrestrial Radio Access (E-UTRA); Packet Data Convergence Protocol (PDCP) specification (Release 14)", Jun. 2017.
3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)", Mar. 2017.
3GPP TS 36.413 V14.2.0, "3rd Generation Partnership Project; Technical Specification Group Radio Access Network; Evolved Universal Terrestrial Radio Access Network (E-UTRAN); S1 Application Protocol (S1AP) (Release 14)", Mar. 2017.
3GPP TS 36.423 V14.2.0, "3rd Generation Partnership Project; Technical Specification Group Radio Access Network; Evolved Universal Terrestrial Radio Access Network (E-UTRAN); X2 application protocol (X2AP) (Release 14)", Mar. 2017.
3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.0.0, "3rd Generation Partnership Project; Technical Specification Group Radio Access Network; Study on New Radio Access Technology Physical Layer Aspects (Release 14)", Mar. 2017.
3GPP TR 38.803 V14.0.0, "3rd Generation Partnership Project; Technical Specification Group Radio Access Network; Study on New Radio Access Technology; RF and co-existence aspects (Release 14)", Mar. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.2.0, "3rd Generation Partnership Project; Technical Specification Group Radio Access Network; Study on channel model for frequency spectrum above 6 GHz (Release 14)", Dec. 2016.
3GPP TR 38.912 V14.0.0, "3rd Generation Partnership Project; Technical Specification Group Radio Access Network; Study on New Radio (NR) access technology (Release 14)", Mar. 2017.
3GPP TR 38.913 V14.2.0, "3rd Generation Partnership Project; Technical Specification Group Radio Access Network; Study on Scenarios and Requirements for Next Generation Access Technologies; (Release 14)", Mar. 2017.
International Search Report issued by the Japan Patent Office for corresponding International Patent Application No. PCT/JP2017/017039, dated Aug. 1, 2017, with an English translation.
Written Opinion of the International Searching Authority issued by the Japan Patent Office for corresponding International Patent Application No. PCT/JP2017/017039, dated Aug. 1, 2017, with an English translation.
Extended European search report with supplementary European search report and the European search opinion issued by the

(56) References Cited

OTHER PUBLICATIONS

European Patent Office for corresponding European Patent Application No. 17907983.5-1205, dated Mar. 20, 2020.

* cited by examiner

FIG. 4

| Acks/Nacks OF CBGs #1 AND #2 | BIT SEQUENCE OF TWO RESOURCE BLOCKS |
|---|---|
| Ack, Ack | 00000000, 00000000 |
| Ack, Nack | 01010101, 01010101 |
| Nack, Ack | 10101010, 10101010 |
| Nack, Nack | 11111111, 11111111 |

FIG. 11

| CBG NUMBER | #1 | #2 | #3 | #4 | #5 | #6 |
|---|---|---|---|---|---|---|
| Ack/Nack | Nack | Ack | Ack | Ack | Ack | Ack |

| CBG NUMBER | #1 | #2 | #3 | #4 | #5 | #6 |
|---|---|---|---|---|---|---|
| Ack/Nack | Nack | Ack | Ack | Ack | Ack | Nack |
| CBG GROUP | ##1 | ##2 | ##3 | | ##4 | |
| Ack/Nack | Nack | Ack | Ack | | Nack | |

FIG. 17

| CBG NUMBER | #1 | #2 | #3 | #4 | #5 | #6 | #7 | #8 |
|---|---|---|---|---|---|---|---|---|
| Ack/Nack | Nack | Ack | Ack | Ack | Ack | Ack | Ack | Nack |
| CBG GROUP | ##1 | | ##2 | | ##3 | | ##4 | |
| Ack/Nack | Nack | | Ack | | Ack | | Nack | |

| CBG GROUP ##3 | CBG GROUP ##4 | USE RESOURCE BLOCK |
|---|---|---|
| Ack | Ack | RESOURCE BLOCK 304 |
| Ack | Nack | RESOURCE BLOCK 303 |
| Nack | Ack | RESOURCE BLOCK 302 |
| Nack | Nack | RESOURCE BLOCK 301 |

| CBG NUMBER | #1 | #2 | #3 | #4 | #5 | #6 |
|---|---|---|---|---|---|---|
| Ack/Nack | Nack | Ack | Ack | Ack | Ack | Ack |
| CBG GROUP | ##1 | | | ##2 | | |
| Ack/Nack | Nack | | | Ack | | |

TERMINAL APPARATUS, BASE STATION APPARATUS, AND WIRELESS COMMUNICATION METHOD

CROSS-REFERENCE TO RELATED APPLICATION

This application is a continuation application of International Application PCT/JP2017/017039 filed on Apr. 28, 2017 and designated the U.S., the entire contents of which are incorporated herein by reference.

FIELD

The embodiments discussed herein are related to a terminal apparatus, a base station apparatus, and a wireless communication method.

BACKGROUND

In a current network, the traffic of mobile terminals such as smartphones or future phones occupies the majority of network resources. The traffic used by the mobile terminals tends to continuously expand.

Meanwhile, for example, in accordance with services such as the Internet of Things (IoT) such as a transportation system, smart meters, and a monitoring system of devices have been developed, there is a demand to cope with the services having a variety of requirements. Thus, for example, in the next generation communication standard such as fifth generation (5G) (5G mobile communication), there is a desire for a technology that realizes higher data rate, larger capacity, and lower delay in addition to a standard technology of the fourth generation (4G) mobile communication. The next generation communication standard has been technically examined by the work group of the 3rd Generation Partnership Project (3GPP). Examples of the work group of the 3GPP include Technical Specification Group (TSG)-Radio Access Network (RAN) work group (WG) 1 and TSG-RAN WG2.

As mentioned above, in order to cope with a wide variety of services, support for many use cases is assumed in the next generation communication system such as 5G. Examples of the use case include cases classified into enhanced Mobile Broadband (eMBB), Massive Machine Type Communications (MTC), Ultra-Reliable and Low Latency Communication (URLLC).

In order to realize efficient data transmission, a Hybrid automatic repeat request (HARQ) technology has been adopted in Long Term Evolution (LTE) which is the 4G communication system. For example, in the HARQ, a reception device requests a transmission device to retransmit data which is not correctly decoded in a process of layer 1 protocol hierarchy such as LTE. In a case where the retransmission of the data is requested, the transmission device transmits retransmission data corresponding to the retransmission request for the data which is not correctly decoded in the reception device. Combination data of the data which is not correctly decoded and the retransmission data is decoded in the reception device. Accordingly, retransmission control with high efficiency and with accuracy is realized. The reception device realizes the retransmission request by respectively transmitting, to the transmission device, information of Ack in a case where the data is correctly decoded and information of Nack in a case where the data is not correctly decoded.

For example, feedback information of Ack/Nack of the LTE is transmitted with 1 bit per transmission time interval (TTI) having 14 symbols.

In 5G New Radio (NR) which is the next generation, it is agreed that the transmission of the feedback information of the Ack/Nack in units of code block Group (CBG) is introduced. The feedback information of the Ack/Nack using the CBGs is transmitted with 1 bit for each unit of CBG. For example, the number of symbols constituting the CBG and the number of symbols for transmitting the feedback information of the Ack/Nack are values which are equal to or less than 14 symbols which are the number of symbols in 1 TTI to be used in the LTE.

Incidentally, in the case of the feedback information of the Ack/Nack using the CBG, the number of bits to be used in the feedback information of Ack/Nack may increase. Thus, there is a possibility that transmission power will increase. For example, in a case where the feedback information of the Ack/Nack and other information items (for example, scheduling requests) are simultaneously transmitted, it is considered that transmission power increases as compared to a case where only the feedback information of the Ack/Nack is transmitted.

However, there are many cases that an upper limit of transmission power of a terminal is configured in advance. Thus, there is a desire to efficiently transmit information such as the feedback information of the Ack/Nack while taking account of the transmission power.

A disclosed technology has been made in view of such circumstances, and provides a terminal apparatus, a base station apparatus, a wireless communication system, and a terminal apparatus control method which efficiently transmit feedback information of Ack/Nack.

As the related arts, for example, following non patent literatures are disclosed.
NPL 1: 3GPP TS 36. 211 V14.2.0 (2017-03)
NPL 2: 3GPP TS 36. 212 V14.2.0 (2017-03)
NPL 3: 3GPP TS 36. 213 V14.2.0 (2017-03)
NPL 4: 3GPP TS 36. 300 V14.2.0 (2017-03)
NPL 5: 3GPP TS 36. 321 V14.2.0 (2017-03)
NPL 6: 3GPP TS 36. 322 V14.0.0 (2017-03)
NPL 7: 3GPP TS 36. 323 V14.2.0 (2017-03)
NPL 8: 3GPP TS 36. 331 V14.2.0 (2017-03)
NPL 9: 3GPP TS 36. 413 V14.2.0 (2017-03)
NPL 10: 3GPP TS 36. 423 V14.2.0 (2017-03)
NPL 11: 3GPP TS 36. 425 V14.0.0 (2017-03)
NPL 12: 3GPP TR 38. 801 V14.0.0 (2017-03)
NPL 13: 3GPP TR 38. 802 V14.0.0 (2017-03)
NPL 14: 3GPP TR 38. 803 V14.0.0 (2017-03)
NPL 15: 3GPP TR 38. 804 V14.0.0 (2017-03)
NPL 16: 3GPP TR 38. 900 V14.2.0 (2016-12)
NPL 17: 3GPP TR 38. 912 V14.0.0 (2017-03)
NPL 18: 3GPP TR 38. 913 V14.2.0 (2017-03)

SUMMARY

According to an aspect of the embodiments, a terminal apparatus includes a receiver configured to receive a radio signal; processor circuitry configured to generate a response signal to respond to the received radio signal; and a transmitter configured to transmit a plurality of types of signals including the generated response signal, wherein a size of a radio resource to be used for transmitting the generated response signal is changed when the plurality of types of signals including the generated response signal are transmitted on one physical uplink control channel (PUCCH) resource.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of values indicating Acks/Nacks of two CBGs to be mapped to the two resource blocks;

FIG. 11 illustrates an example of Acks/Nacks of CBGs;

FIG. 14 illustrates an example of CBG groups generated by PUCCH generating unit according to Embodiment 3;

FIG. 17 illustrates an example of CBG groups generated by a PUCCH generating unit, direct notification CBGs, and indirect notification CBGs according to Embodiment 4;

FIG. 18 illustrates an example of a use resource table;

FIG. 21 illustrates an example of CBG groups generated by a PUCCH generating unit according to Embodiment 6;

DESCRIPTION OF EMBODIMENTS

Hereinafter, embodiments of a terminal apparatus, a base station apparatus, a wireless communication system, and a terminal apparatus control method disclosed in the present application will be described in detail with reference to the drawings. The terminal apparatus, the base station apparatus, the wireless communication system, and the terminal apparatus control method disclosed in the present application are not limited to the following embodiments.

Embodiment 1

Figure 1:
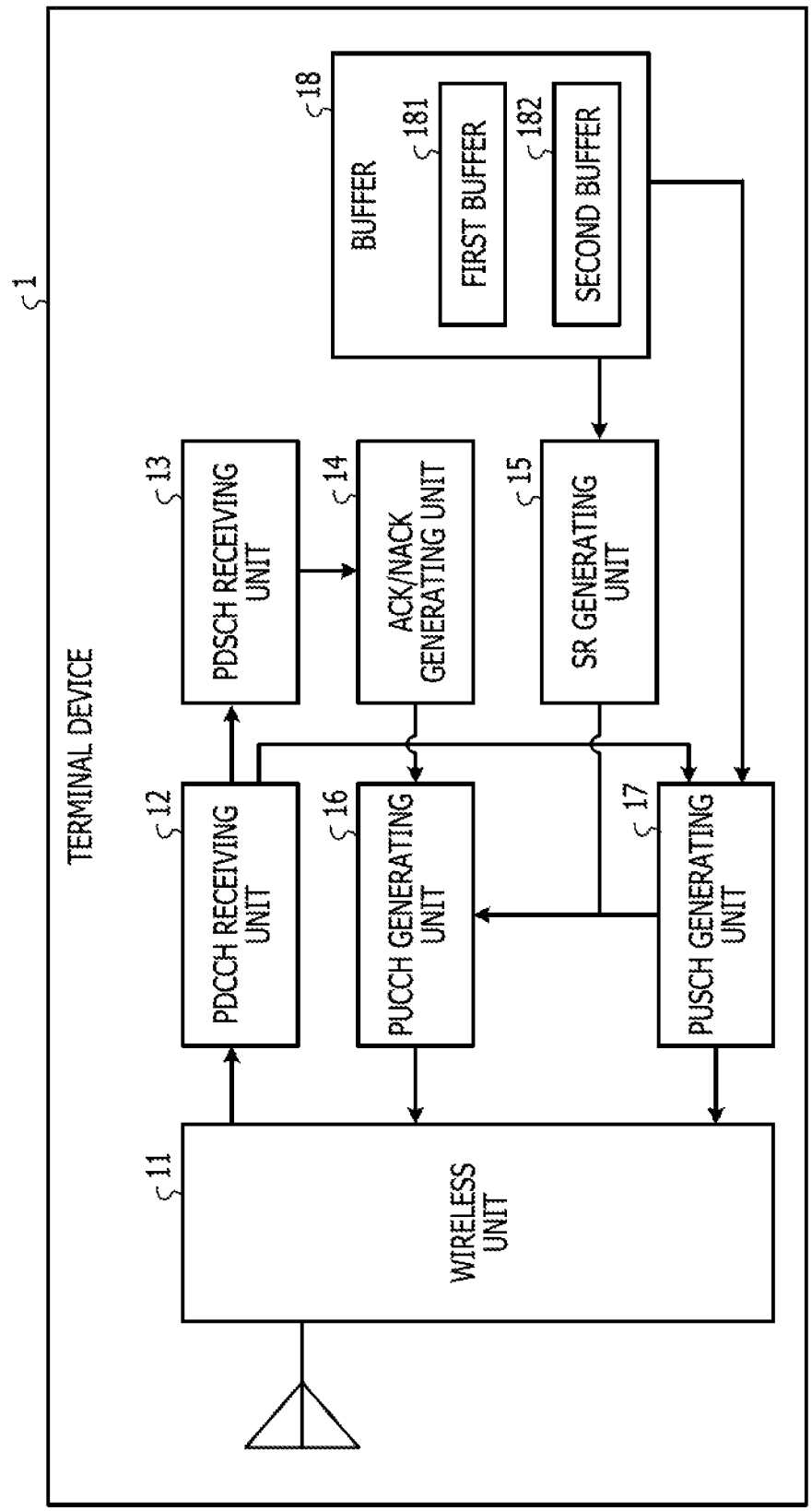
FIG. 1 is a block diagram of a terminal apparatus.

FIG. 1 is a block diagram of the terminal apparatus. A terminal apparatus 1 transmits and receives data items to and from a base station apparatus 2 to be described below through wireless communication. In the present embodiment, the terminal apparatus 1 and the base station apparatus 2 use a code block group (CBG) Feedback scheme as a HARQ feedback scheme. Hereinafter, the CBG feedback scheme will be described.

Figure 2:
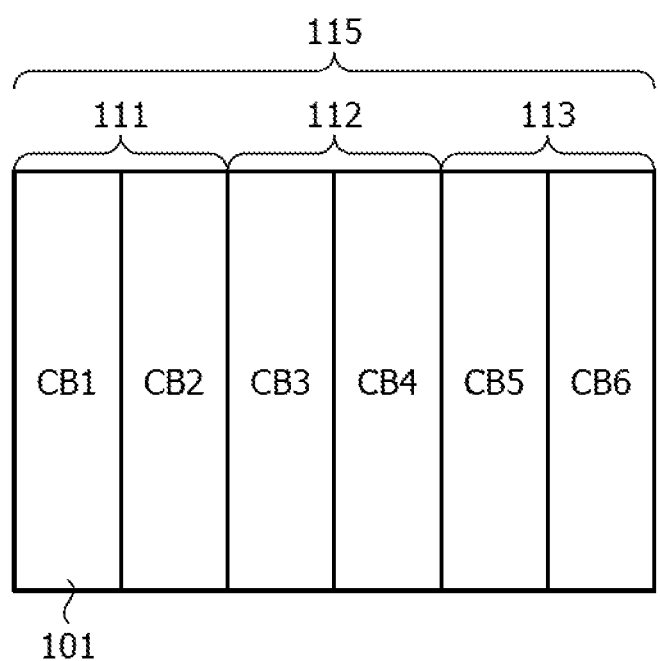
FIG. 2 is a diagram for describing a CBG feedback scheme.

FIG. 2 is a diagram for describing the CBG feedback scheme. The terminal apparatus 1 receives data items from the base station apparatus 2 with a transport block 115 including code brock groups (CBGs) 111 to 113 in which a predetermined number of code blocks (CBs) 101 are aggregated as a basic unit. Although it has been described in FIG. 2 that two code blocks 101 are aggregated in each of the CBGs 111 to 113, the number of code blocks of each of the CBGs 111 to 113 is not limited thereto. Hereinafter, in a case where the CBGs 111 to 113 are not distinguished from each other, the CBGs are referred to as "CBGs 110". The code block 101 is an example of a "first group". The CBG 110 is an example of a "second group".

The terminal apparatus 1 includes a wireless unit 11, a Physical Downlink Control Channel (PDCCH) receiving unit 12, and a physical downlink sheared channel (PDSCH) receiving unit 13. The terminal apparatus 1 further includes an acknowledgement (ACK)/negative acknowledgement (NACK) generating unit 14, and a scheduling request (SR) generating unit 15. The terminal apparatus further includes a physical uplink control channel (PUCCH) generating unit 16, a physical uplink sheared channel (PUSCH) generating unit 17, and a buffer 18.

The wireless unit 11 receives PDCCH and PDSCH signals including control signals and data items from the base station apparatus 2 through an antenna. The signals received by the wireless unit 11 include the transport block 115 including the plurality of CBGs 110 illustrated as FIG. 2. The wireless unit 11 performs analog-to-digital (AD) conversion on the received signals. Thereafter, the wireless unit 11 outputs the received PDCCH and PDSCH signals to the PDCCH receiving unit 12.

The wireless unit 11 receives signals indicating ACKs/NACKs from the PUCCH generating unit 16. Subsequently, the wireless unit 11 performs digital-to-analog (DA) conversion on the signals indicating the ACKs/NACKs. Thereafter, the wireless unit 11 transmits the signals indicating the ACKs/NACKs to the base station apparatus 2 through the antenna.

The wireless unit 11 receives signals including data items from the PUSCH generating unit 17. Subsequently, the wireless unit 11 performs DA conversion on the signals including the data items. Thereafter, the wireless unit 11 transmits the signals including the data items to the base station apparatus 2 through the antenna.

The PDCCH receiving unit 12 receives the PDCCH and PDSCH signals including the control signals and the data items from the wireless unit 11. The PDCCH receiving unit 12 obtains the control signal by performing demodulation and decoding on the PDCCH signal. The control signal also includes allocation information of radio resources. Thereafter, the PDCCH receiving unit 12 outputs the control signal and the PDSCH signal to the PDSCH receiving unit 13.

The PDSCH receiving unit 13 receives the control signal and the PDSCH signal from the PDCCH receiving unit 12. Subsequently, the PDSCH receiving unit 13 obtains the data items by performing demodulation and decoding on the PDCCH signal by using a modulation and coding scheme (MCS) designated by the control signal.

Subsequently, the PDSCH receiving unit 13 specifies the CBG 110 included in the data of one transport block 115. The PDSCH receiving unit 13 determines whether or not the data items are decoded for the CBGs 110 included in the transport block 115.

The PDSCH receiving unit 13 notifies the ACK/NACK generating unit 14 that the decoding of the data has succeeded for the CBG 110 from which the data is decoded. The PDSCH receiving unit 13 notifies the ACK/NACK generating unit 14 of the decoding fail of the data for the CBG 110 for which the decoding of the data has failed. The PDSCH receiving unit 13 is an example of a "reception unit".

The ACK/NACK generating unit 14 receives a success notification of the decoding of the data or a fail notification of the decoding of the data for each CBG 110 from the PDSCH receiving unit 13. The ACK/NACK generating unit 14 generates an Ack indicating the decoding success of the data or a Nack indicating the decoding fail of the data for each CBG 110. Hereinafter, information including at least one or both of the Ack and the Nack is referred to as "Ack/Nack".

Figure 3:
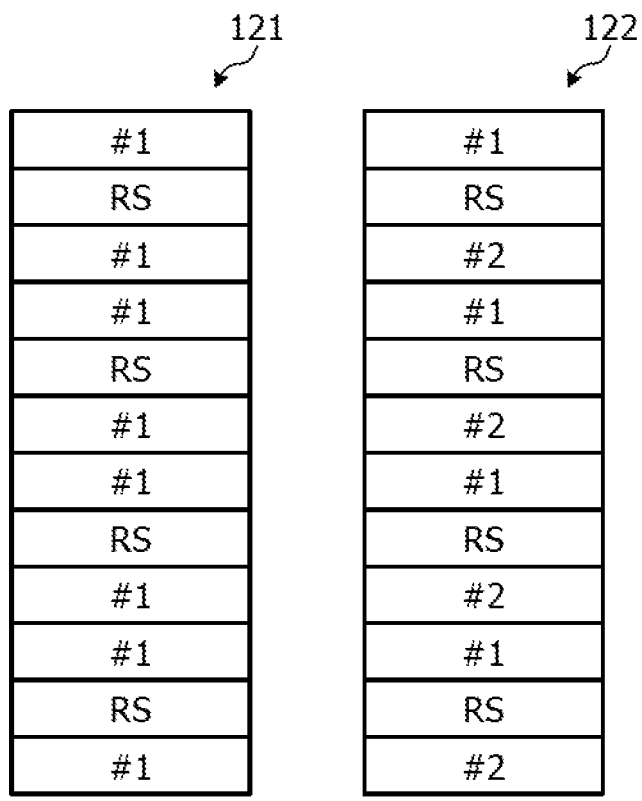
FIG. 3 illustrates an example of a bit pattern representing Acks/Nacks mapped to subcarriers.

Hereinafter, the generation of the Ack/Nack of each CBG 110 will be described. FIG. 3 illustrates an example of a bit pattern representing Acks/Nacks mapped to subcarriers. Hereinafter, Acks/Nacks of two CBGs #1 and #2 will be described.

Each of resource blocks 121 and 122 includes 12 subcarriers. Each subcarrier has a value. Acks/Nacks are transmitted to the base station apparatus 2 by using the resource blocks 121 and 122. FIG. 3 illustrates that a value of the Ack/Nack of the CBG #1 or #2 is input to each subcarrier.

The resource blocks 121 represent the mapping of a bit pattern of Acks/Nacks in a case where a 1-bit Ack or Nack of the CBG #1 is represented in one resource block. In this case, the subcarriers represent the values of the Acks or the Nacks of all CBGs #1 except for reference signals (RSs) of the resource blocks 121. For example, when a value indicating the ACK is 0 and a value indicating the Nack is 1, in a case where the Acks of the CBGs #1 are replied, a value of 0 is stored in all the subcarriers included in the resource blocks 121 except for the RSs. In a case where the Nacks of the CBGs #1 are replied, a value of 1 is stored in all the subcarriers included in the resource blocks 121 except for the RSs.

In this case, since the value of the Ack or the Nack of one CBG is stored in one resource block, the ACK/NACK generating unit 14 generates a bit sequence of eight bits arranged so as to have the same value, as the Acks/Nacks of the CBGs #1, for the resource blocks 121. In this case, the base station apparatus 2 obtains the Ack/Nack of the CBG #1 from one of the resource blocks 121 of the received signals.

Meanwhile, the resource blocks 122 represent the mapping of a bit pattern of Acks/Nacks in a case where a 1-bit Ack or Nack of the CBG #1 or #2 is represented in one resource block. In this case, the value indicating the Ack or the Nack of the CBG #1 or the value indicating the Ack or the Nack of the CBG #2 is stored in each subcarrier except for the RSs of the resource blocks 122. For example, as represented by the resource blocks 122, the value indicating the Ack/Nack of the CBG #1 and the value indicating the Ack/Nack of the CBG #2 are alternately mapped to the subcarriers except for the RSs. In this case, the Acks/Nacks of the two CBGs #1 and #2 are represented in two resource blocks.

In this case, when the value indicating the Ack is 0 and the value indicating the Nack is 1, the ACK/NACK generating unit 14 generates a bit sequence as much as two resource blocks indicating the Acks/Nacks of the CBGs #1 and #2, as illustrated as FIG. 4. FIG. 4 illustrates an example of the values indicating the Acks/Nacks of the two CBGs to be mapped to the two resource blocks.

For example, in a case where a reception response to the CBG #1 is Ack and a reception response of the CBG #2 is Nack, the ACK/NACK generating unit 14 generates bit sequences of "01010101, 01010101". In this case, the base station apparatus 2 obtains the Acks/Nacks of the CBGs #1 and #2 by adding information items of two of the resource blocks 122 of the received signals.

In a case where the number of reception responses of the CBGs 110 to be represented in one resource block increases, the ACK/NACK generating unit 14 increases the number of patterns of bit sequences to be represented by 0 and 1. As stated above, the ACK/NACK generating unit 14 may generate the Ack/Nack such that the information of the Ack/Nack of one CBG 110 is represented in one resource block 121. Alternatively, the ACK/NACK generating unit 14 may generate the Acks/Nacks such that the information items of the Acks/Nacks of a plurality of CBGs 110 in a plurality of resource blocks 121.

Figure 5:
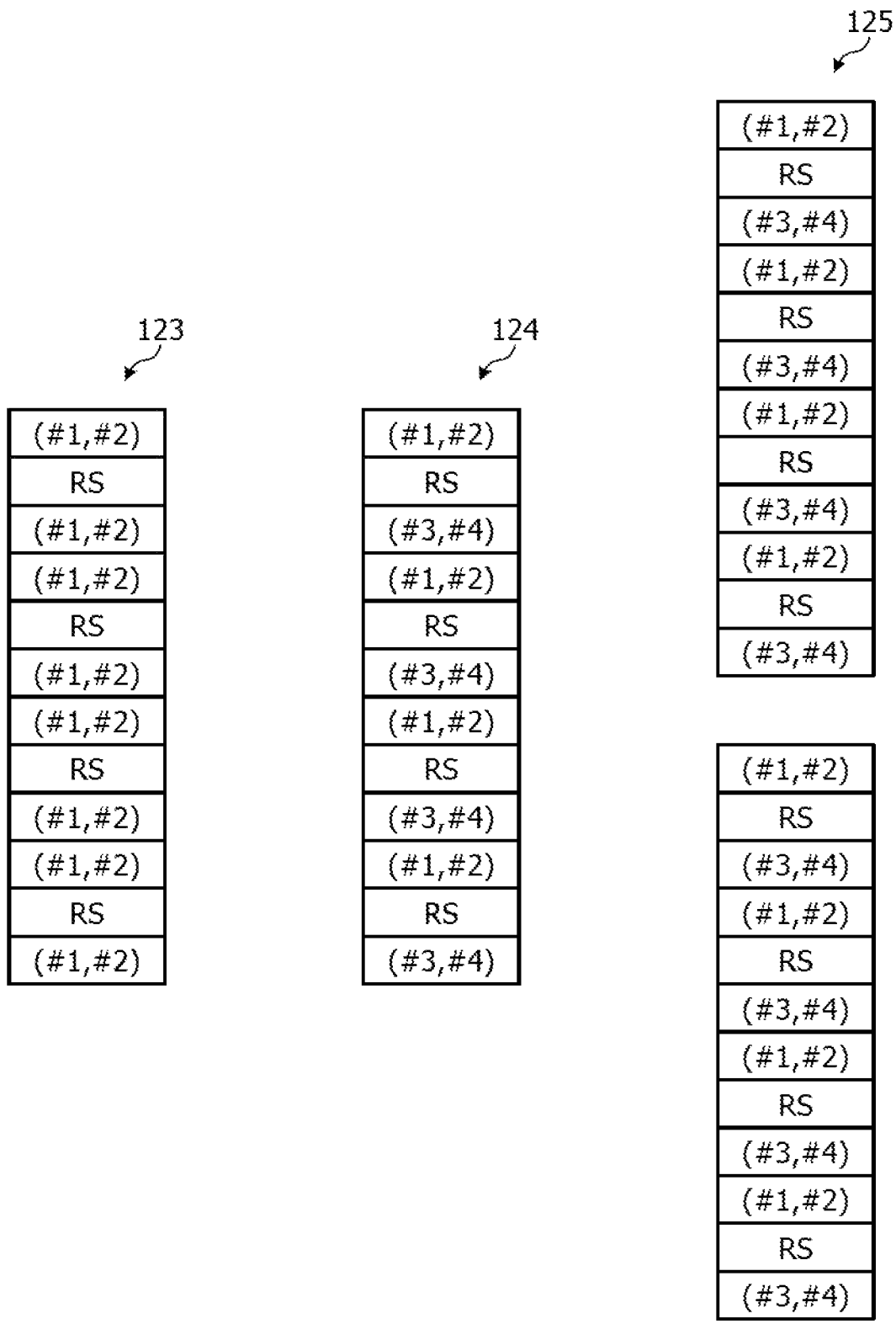
FIG. 5 illustrates an example in which the Acks/Nacks of the two CBGs are mapped to one subcarrier within one resource block.

The Acks/Nacks of the plurality of CBGs may be mapped to one subcarrier. An example in which the Acks/Nacks of the plurality of CBGs are mapped to one subcarrier will be described with reference to FIG. 5. FIG. 5 illustrates an example in which the Acks/Nacks of the two CBGs are mapped to one subcarrier within one resource block. In FIG. 5, information of one subcarrier is, for example, 2-bit information in a case where the subcarrier is modulated by a quadrature phase-shift keying (QPSK) scheme.

For example, resource blocks 123 of FIG. 5 represent the mapping of a bit pattern of Acks/Nacks in a case where Acks/Nacks of two CBGs are transmitted over one resource block. In this case, the subcarrier of each of the resource blocks 123 has 2 bits. The subcarriers represent the values of the Acks or Nacks of all the CBGs #1 and #2 except for the RSs of the resource blocks 123. In this case, the subcarriers are modulated by the QPSK scheme. For example, when the value indicating the Ack is 0 and the value indicating the Nack is 1, in a case where the Ack of the CBG #1 is returned and the Nack of the CBG #2 is replied, the value of (0, 1) is stored in all the subcarriers included in the resource blocks 123 except for the RSs.

In this case, since the values of the Acks/Nacks of the two CBGs are stored in the one resource block, the ACK/NACK generating unit 14 generates a bit sequence of 16 bits arranged so as to have the same value, as the Acks/Nacks of the CBGs #1 and #2, for the resource blocks 123. In this case, the base station apparatus 2 obtains the Acks/Nacks of the CBGs #1 and #2 from one of the resource blocks 123 of the received signals.

Resource blocks 124 of FIG. 5 represent the mapping of a bit pattern of Acks/Nacks in a case where Acks/Nacks of four CBGs are transmitted over one resource block. In this case, the subcarrier of one of the resource blocks 123 has 2 bits. The values indicating the Acks or the Nacks of the CBGs #1 and #2 or the values indicating the Acks or the Nacks of the CBGs #3 and #4 are stored in the subcarriers except for the RSs of the resource blocks 124. In this case, the subcarriers are also modulated by the QPSK scheme. For example, as represented by the resource blocks 124, the values indicating the Acks/Nacks of the CBGs #1 and #2 and the values indicating the Acks/Nacks of the CBGs #3 and #4 are alternately mapped to the subcarriers except for the RSs. In this case, the Acks/Nacks of the four CBGs #1 to #4 are represented in one resource block.

In this case, since the values of the Acks or the Nacks of the four CBGs are stored in the one resource block, the ACK/NACK generating unit 14 generates a bit sequence of 32 bits arranged so as to have the same value, as the Acks/Nacks of the CBGs #1 to #4, for the resource blocks 124. In this case, the base station apparatus 2 obtains the Acks/Nacks of the CBGs #1 to #4 from one of the resource blocks 123 of the received signals.

A resource block group 125 of FIG. 5 represents the mapping of a bit pattern of Acks/Nacks in a case where Acks/Nacks of four CBGs are transmitted over two resource blocks. In this case, the subcarrier of the resource block group 125 has 2 bits. The values indicating the Acks or the Nacks of the CBGs #1 and #2 or the values indicating the Acks or the Nacks of the CBGs #3 and #4 are stored in the subcarriers except for the RSs of the resource blocks 125. In this case, the subcarriers are also modulated by the QPSK scheme. For example, as represented by the resource block group 125, the values indicating the Acks/Nacks of the CBGs #1 and #2 and the values indicating the Acks/Nacks of the CBGs #3 and #4 are alternately mapped to the subcarriers in the subcarriers except for the RSs. In this case, the Acks/Nacks of the four CBGs #1 to #4 are represented in the two resource blocks.

In this case, since the values of the Acks or the Nacks of the four CBGs are stored in one resource block, the ACK/NACK generating unit 14 generates a bit sequence of 32 bits arranged so as to have the same value, as the Acks/Nacks of the CBGs #1 to #4, for the resource block group 125. In this case, the base station apparatus 2 obtains the Acks/Nacks of the CBGs #1 to #4 from two of the resource blocks 123 of the received signals.

The ACK/NACK generating unit 14 outputs an aggregation of Acks and Nacks of the CBGs 110, as a reception response of one transport block 115, to the PUCCH generating unit 16. The ACK/NACK generating unit 14 is an example of a "response signal generating unit".

The buffer 18 includes a first buffer 181 and a second buffer 182. Data items of logical channels classified according to requirements such as delay or reliability or quality of service (QoS) are stored in the first buffer 181 and the second buffer 182. The first buffer 181 is a buffer that stores transmission data items in a high-priority process with low delay, such as Ultra-Reliable and Low Latency Communication (URLLC). The second buffer 182 is a buffer that stores transmission data items in a low-priority process such as enhanced Mobile Brad Band (eMBB) or web browsing. The transmission data items generated in an arithmetic operation process performed by a central processing unit (CPU) are stored in the first buffer 181 or the second buffer 182 by the CPU.

The SR generating unit 15 checks whether or not the transmission data items are stored in the first buffer 181 or the second buffer 182. In a case where the transmission data items are stored in the first buffer 181 or the second buffer 182, the SR generating unit 15 generates radio resource allocation requests for requesting the allocation of radio resources to be used for transmitting the transmission data items.

The SR generating unit 15 outputs the radio resource allocation requests and information of the first buffer 181 or the second buffer 182 which is a storage of the transmission data items to the PUCCH generating unit 16. The SR generating unit 15 is an example of a "radio resource allocation request generating unit".

Figure 6:
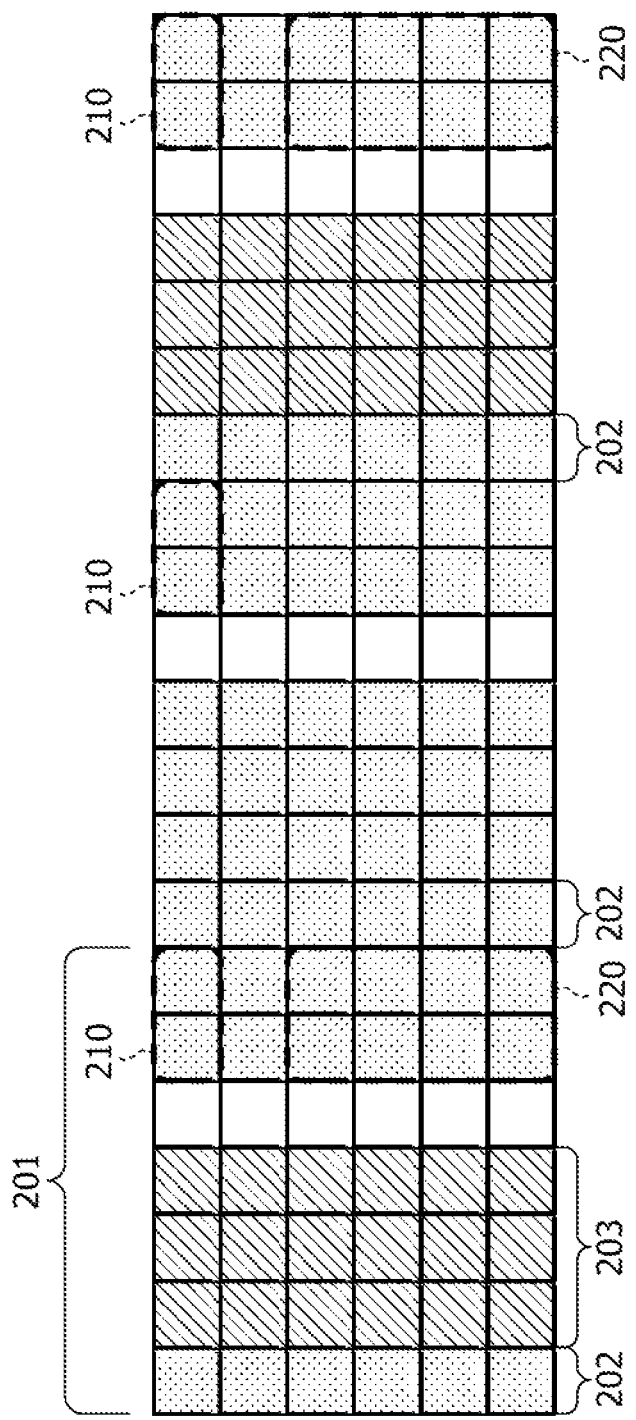
FIG. 6 illustrates the allocation of radio resources.

The PUCCH generating unit 16 receives information of the reception response of one transport block 115 which is the aggregation of ACKs and NACKs of the CBGs 110 from the ACK/NACK generating unit 14. The PUCCH generating unit 16 receives the radio resource allocation requests from the SR generating unit 15. The radio resources allocated to the reception responses and the radio resource allocation requests in advance will be described with reference to FIG. 6. FIG. 6 illustrates the allocation of the radio resources. In FIG. 6, a vertical direction represents frequency, and a horizontal direction represents time.

In FIG. 6, a section positioned between the PDCCH 202 is a transmission time interval (TTI) 201. The PDSCH 203 is transmitted and received after the PDCCH 202. The radio resources 210 are radio resources allocated to the radio resource allocation requests in advance. The radio resources 220 are radio resources allocated to the reception responses in advance. Although it has been described in the present embodiment that signals are transmitted in units of two symbols in the PUCCH which transmits the reception responses, another transmission unit may be used as the transmission units of the signals in the PUCCH. For example, the signals may be transmitted in a unit of one symbol in the PUCCH. Hereinafter, the radio resources allocated to the reception responses and the radio resource allocation requests in advance illustrated as FIG. 6 are referred to as "normal radio resources".

The PUCCH generating unit 16 determines whether or not to simultaneously send the reception responses and the radio resource allocation requests in a certain TTI 201. Hereinafter, a case where the reception responses and the radio resource allocation requests are simultaneously transmitted in a certain TTI 201 at the same timing is referred to as "simultaneous transmission". For example, the simultaneous transmission corresponds to a case where the transmission of the reception responses and the radio resource allocation requests using the radio resources 210 and the radio resources 220 overlapping each other in a time direction occurs in the terminal apparatus 1.

The PUCCH generating unit 16 performs coding and modulation on data indicating the Ack/Nack which is the reception responses or data indicating the radio resource allocation requests in a case where these data items are simultaneously transmitted. Thereafter, the PUCCH generating unit 16 allocates the normal radio resources to the coded and modulated data.

Figure 7:
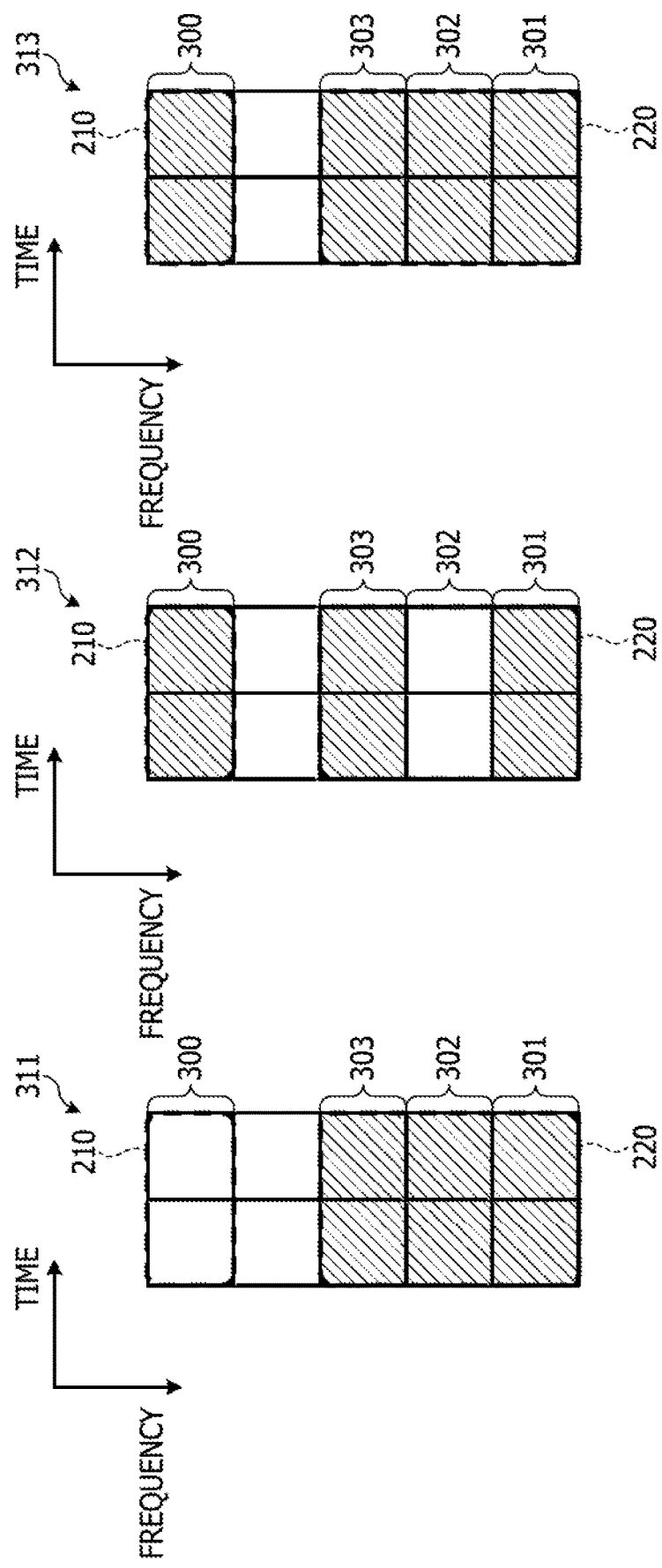
FIG. 7 illustrates the allocation of radio resources using a terminal apparatus according to Embodiment 1.

FIG. 7 illustrates the allocation of the radio resources using the terminal apparatus according to Embodiment 1. In allocation states 311 to 313 in FIG. 7, a vertical direction represents frequency, and a horizontal direction represents time. For example, in a case where the radio resource allocation requests are not sent and the reception responses are sent, the PUCCH generating unit 16 allocates the radio resources as represented in the allocation state 311 of FIG. 7. For example, the PUCCH generating unit 16 allocates the radio resources 220 of resource blocks 301 to 303 to the reception responses. In this case, the radio resources 210 of a resource block 300 are not allocated. In contrast, in a case where the reception responses are not sent and the radio resource allocation requests are sent, the PUCCH generating unit 16 allocates the radio resources 210 of the resource block 300.

The PUCCH generating unit 16 maps the data items indicating the Acks/Nacks or the data items indicating the radio resource allocation requests to the PUCCH according to the allocation of the radio resources, and generates signals. Thereafter, the PUCCH generating unit 16 transmits the generated signals to the base station apparatus 2 through the wireless unit 11. In this case, the PUCCH generating unit 16 transmits the radio resource allocation requests to the base station apparatus 2 by using the radio resources 210. The PUCCH generating unit 16 transmits the reception responses to the base station apparatus 2 by using the radio resources 220.

Next, a process using the PUCCH generating unit 16 in the case of the simultaneous transmission will be described. A state in which the reception responses and the radio resource allocation requests at the time of the simultaneous transmission are allocated to the normal radio resources as in a case where the reception responses and the radio resource allocation requests are simultaneously transmitted is referred to as a "normal allocation state".

In the case of the simultaneous transmission, the PUCCH generating unit 16 allocates the radio resources as represented in the allocation state 312 of FIG. 7. For example, the PUCCH generating unit 16 stores information items of the resource blocks to be allocated to the reception responses at the time of the simultaneous transmission in advance. For example, the PUCCH generating unit 16 stores one excluded resource block among the resource blocks included in the normal radio resources of the reception responses in advance. The PUCCH generating unit 16 allocates the radio resources 210 to be allocated to the radio resource allocation requests in the normal allocation state to the data indicating the Ack/Nack to which the excluded resource block is allocated in the case of the normal allocation state.

Subsequently, the resource block other than the excluded resource block of the radio resources 220 is allocated to the data indicating the Ack/Nack other than the data to which the radio resources 210 is allocated as in the normal allocation state. For example, as represented in the allocation state 312, the PUCCH generating unit 16 allocates the resource blocks 301 and 303 in the radio resources 220 to the data indicating the Ack/Nack other than the data to which the radio resources 210 are allocated. In this case, the PUCCH generating unit 16 does not use the resource block 302.

The radio resources are allocated in this manner, and thus, the PUCCH generating unit 16 notifies the base station apparatus 2 of the generation of the SRs by adding a non-use resource block over which the Ack/Nack is not transmitted to the normal radio resources.

Which one of the resource blocks 301 to 303 is unused may be freely determined. The base station apparatus 2 easily detects that the resource block positioned between the resource blocks in use is unused. Thus, it is preferable that the PUCCH generating unit 16 selects the non-use resource block such that the non-use resource block is positioned between the resource blocks in use as in the allocation state 312.

The contents of the signals to be mapped to the non-use resource block in the normal allocation state may be applied as the contents of the signals to be mapped to the radio resources 210 with no change. Alternatively, the non-use resource block of the radio resources 220 and the non-use resource block of the radio resources 210 may be arranged in order of frequency and the mapping may be performed by the same method as that in the transmission of the Ack/Nack in the normal allocation state, that is, in descending or ascending order of frequency.

The PUCCH generating unit 16 determines whether radio resource allocation requests to be transmitted are radio resource allocation requests for the transmission data items stored in the first buffer 181 or the second buffer 182. The PUCCH generating unit 16 has a parameter for adjusting transmission power density different between the transmission of the transmission data items in the high-priority process which are stored in the first buffer 181 and the transmission of the transmission data items in the high-priority process which are stored in the second buffer 182.

In the present embodiment, the PUCCH generating unit 16 has a parameter with which the transmission power density increases, as a parameter in the case of the transmission of the transmission data items stored in the first buffer 181. The PUCCH generating unit 16 has a parameter with which the transmission power density is lower than that in the case of the transmission of the transmission data items stored in the first buffer 181, as a parameter in the case of the transmission of the transmission data items stored in the second buffer 182. For example, the parameter is an offset to the transmission power density in the case where the reception responses are transmitted. For example, a value of the parameter is designated by a radio resource control (RRC) signal or the PDCCH when a resource configuration of the PUCCH is notified from the base station apparatus 2.

When the radio resource allocation requests to be transmitted are the radio resource allocation requests for transmitting the transmission data items stored in the first buffer 181, the PUCCH generating unit 16 increases the transmission power density of the radio resources allocated to the reception responses as in the allocation state 312. In contrast, when the radio resource allocation requests to be transmitted are the radio resource allocation requests for the transmission data items in the low-priority process which are stored in the second buffer 182, the PUCCH generating unit 16 equalizes the transmission power density of the reception responses to the transmission power density at the time of the transmission of the normal reception responses as in the allocation state 312.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 notifies the base station apparatus 2 of the information items of the Acks/Nacks of the CBGs 110 and the generation of the radio resource allocation requests.

In the present embodiment, when the allocation in the normal allocation state is performed and transmission power is not insufficient even in the case of the simultaneous transmission, the PUCCH generating unit 16 may usually perform the allocation of the radio resources in the normal allocation state as in the allocation state 313. In this case, the PUCCH generating unit 16 uses all the resource blocks 300 to 301.

As stated above, in the present embodiment, the radio resources are not used as much as normal allocation resources of the radio resource allocation requests in the case of simultaneous reception as compared to the normal allocation state. For example, the number of non-use radio resources does not increase. When the radio resource allocation requests to be transmitted are the radio resource allocation requests for low-priority transmission data items, since the radio resource allocation requests may be transmitted with reliability equivalent to the reliability of the Ack/Nack, the transmission power is sufficiently supplied. In contrast, when the radio resource allocation requests to be transmitted are the high-priority radio resource allocation requests, the transmission with higher transmission power density is desirable in order to increase the reliability, and there is a possibility that the transmission power will be insufficient. The PUCCH generating unit 16 is an example of a "transmission unit".

Referring back to FIG. 1, the description will be continued. The PUSCH generating unit 17 obtains information items of the radio resources for transmitting the transmission data items designated by the response to the radio resource allocation request from the PDCCH receiving unit 12. Subsequently, the PUSCH generating unit 17 obtains the transmission data items corresponding to the transmitted radio resource allocation requests from the first buffer 181 or the second buffer 182 of the buffer 18.

The PUSCH generating unit 17 performs the coding and the modulation on the obtained transmission data items. Subsequently, the PUSCH generating unit 17 allocates the designated radio resources to the coded and modulated transmission data items. Thereafter, the PUSCH generating unit 17 maps the transmission data items to the PUSCH according to the allocation of the radio resources. Thereafter, the PUSCH generating unit 17 transmits the generated signals to the base station apparatus 2 through the wireless unit 11.

Figure 8:
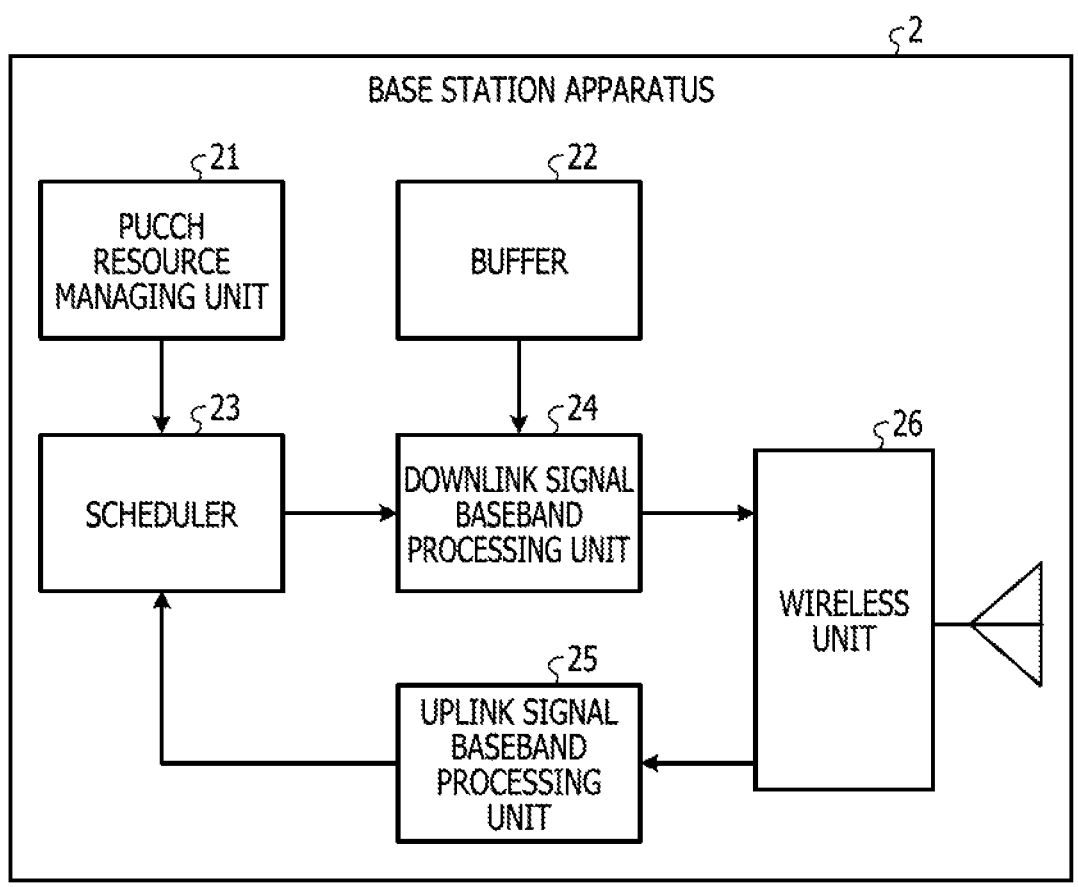
FIG. 8 is a block diagram of a base station apparatus.

Next, the base station apparatus 2 will be described with reference to FIG. 8. FIG. 8 is a block diagram of the base station apparatus. As illustrated as FIG. 8, the base station apparatus 2 includes a PUCCH resource managing unit 21, a buffer 22, a scheduler 23, a downlink signal baseband processing unit 24, an uplink signal baseband processing unit 25, and a wireless unit 26. The buffer 22 is a temporary storage area of the transmission data items obtained by the base station apparatus 2.

The PUCCH resource managing unit 21 notifies the scheduler 23 of resource configuration information for the radio resource allocation request and resource configuration information for the Ack/Nack. The PUCCH resource managing unit 21 may periodically configure the normal radio resources of the radio resource allocation requests and the reception responses for transmitting the Acks/Nacks with a predetermined cycle. The PUCCH resource managing unit 21 may determine the normal radio resources of the radio resource allocation requests and the reception responses for transmitting the Acks/Nacks at each TTI, and may configure the determined normal radio resources.

The scheduler 23 specifies data items to be transmitted among the transmission data items stored in the buffer 22. The scheduler 23 performs scheduling on the transmission of the specified data items.

Subsequently, the scheduler 23 divides the data of the transport block 115 to be transmitted into the CBGs 110. Subsequently, the scheduler 23 determines an MCS to be used. For example, the scheduler 23 selects an MCS for further increasing the redundancy of data items for the URLLC as compared to data items for the eMBB. The scheduler 23 generates control information for transmitting and receiving the data items. The scheduler 23 determines the radio resources over which the data items and the control information are transmitted. Thereafter, the scheduler 23 outputs information of each CBG 110 of the transport block 115 for the data to be transmitted, information of the MCS, the generated control information, and information of the radio resources to the downlink signal baseband processing unit 24.

Thereafter, the scheduler 23 receives a 1-bit ACK or NACK for each CBG 110 from the uplink signal baseband processing unit 25. The scheduler 23 receives the radio resource allocation requests from the uplink signal baseband processing unit 25.

The scheduler 23 specifies the CBG 110, among the CBGs 110 included in the transmitted transport block 115, over which the NACK is received. The scheduler 23 determines data items to be retransmitted.

The scheduler 23 generates the control information. In a case where the radio resource allocation requests are received, the scheduler 23 determines normal radio resources to be used for the transmission data items. The scheduler 23 determines radio resources to be used in the retransmission of the data items. Thereafter, the scheduler 23 outputs information of the data to be retransmitted, information of the MCS, the generated control information, information of the radio resources to be used to the downlink signal baseband processing unit 24. The scheduler 23 repeats the retransmission until ACKs for all the CBGs 110 are received.

The downlink signal baseband processing unit 24 receives the information of the data to be transmitted or retransmitted, the information of the MCS, the control information, and the information of the radio resources to be used from the scheduler 23. Subsequently, the downlink signal baseband processing unit 24 obtains the data corresponding to the received information of the data to transmitted or retransmitted from the buffer 22. Subsequently, the downlink signal baseband processing unit 24 performs coding on the obtained data and control information by using a coding rate designated by the received information of the MCS. The downlink signal baseband processing unit 24 performs modulation on the obtained data and control information by using the modulation scheme designated by the received information of the MCS. Thereafter, the downlink signal baseband processing unit 24 allocates the control information and the data to the designated radio resources, maps the control information to the PDCCH, and maps the data to the PDSCH. The downlink signal baseband processing unit 24 outputs the control information and the data to the wireless unit 26.

The wireless unit 26 receives the control information and the data from the downlink signal baseband processing unit 24. Subsequently, the wireless unit 26 performs digital-to-analog (DA) conversion on the control information and the data. Thereafter, the wireless unit 26 transmits the control signal and the data to the terminal apparatus 1 through the antenna by using the allocated radio resources.

The wireless unit 26 receives the signals including any one or both of the reception responses and the radio resource allocation requests of the data transmitted through the antenna from the terminal apparatus 1. The wireless unit 26 performs analog-to-digital (AD) conversion on the received signals. Thereafter, the wireless unit 26 outputs the signals including any one or both of the reception responses and the radio resource allocation requests of the transmitted data items to the uplink signal baseband processing unit 25. The wireless unit 26 is an example of a "base station reception unit".

The uplink signal baseband processing unit 25 performs demodulation and decoding on the signal including any one or both of the reception responses and the radio resource allocation requests of the transmitted data items. The uplink signal baseband processing unit 25 determines whether or not the information items of the Acks/Nacks are included in all the resource blocks of the radio resources 220 of the received signals. In a case where the information items of the Acks/Nacks are included in all the resource blocks of the radio resources 220 of the received signals, for example, in a case where the non-use resource block is not included, the uplink signal baseband processing unit 25 determines that the reception responses and the radio resource allocation requests are not simultaneously transmitted.

When the simultaneous transmission is not performed, the uplink signal baseband processing unit 25 obtains the information items of the Acks/Nacks of the CBGs 110 from the radio resources 220 which are the normal radio resources of the reception responses.

In contrast, in a case where the non-use resource block is included, the uplink signal baseband processing unit 25 recognizes the generation of the radio resource allocation requests. The uplink signal baseband processing unit 25 stores the resource blocks to be used for transmitting the reception responses at the time of the simultaneous transmission represented in the allocation state 312 of FIG. 7 in advance. The uplink signal baseband processing unit 25 obtains the information items of the Acks/Nacks of the CBGs 110 from the resource block determined in advance.

In a case where the information items of the Acks/Nacks are not included in all the resource blocks of the radio resources 220, the uplink signal baseband processing unit 25 determines whether or not the radio resource allocation requests are mapped to the resources 210. In a case where the radio resource allocation requests are mapped to the radio resources 210, the uplink signal baseband processing unit 25 recognizes the generation of the radio resource allocation requests. In contrast, in a case where the radio resource allocation requests are not mapped to the radio resources 210, the uplink signal baseband processing unit 25 determines that the reception responses and the radio resource allocation requests are not received.

Thereafter, the uplink signal baseband processing unit 25 outputs the information items of the Acks/Nacks of the CBGs 110 to the scheduler 23. In a case where it is determined that the radio resource allocation requests are generated, the uplink signal baseband processing unit 25 notifies the scheduler 23 of the generation of the radio resource allocation requests. The uplink signal baseband processing unit 25 is an example of an "obtainment unit".

Figure 9:
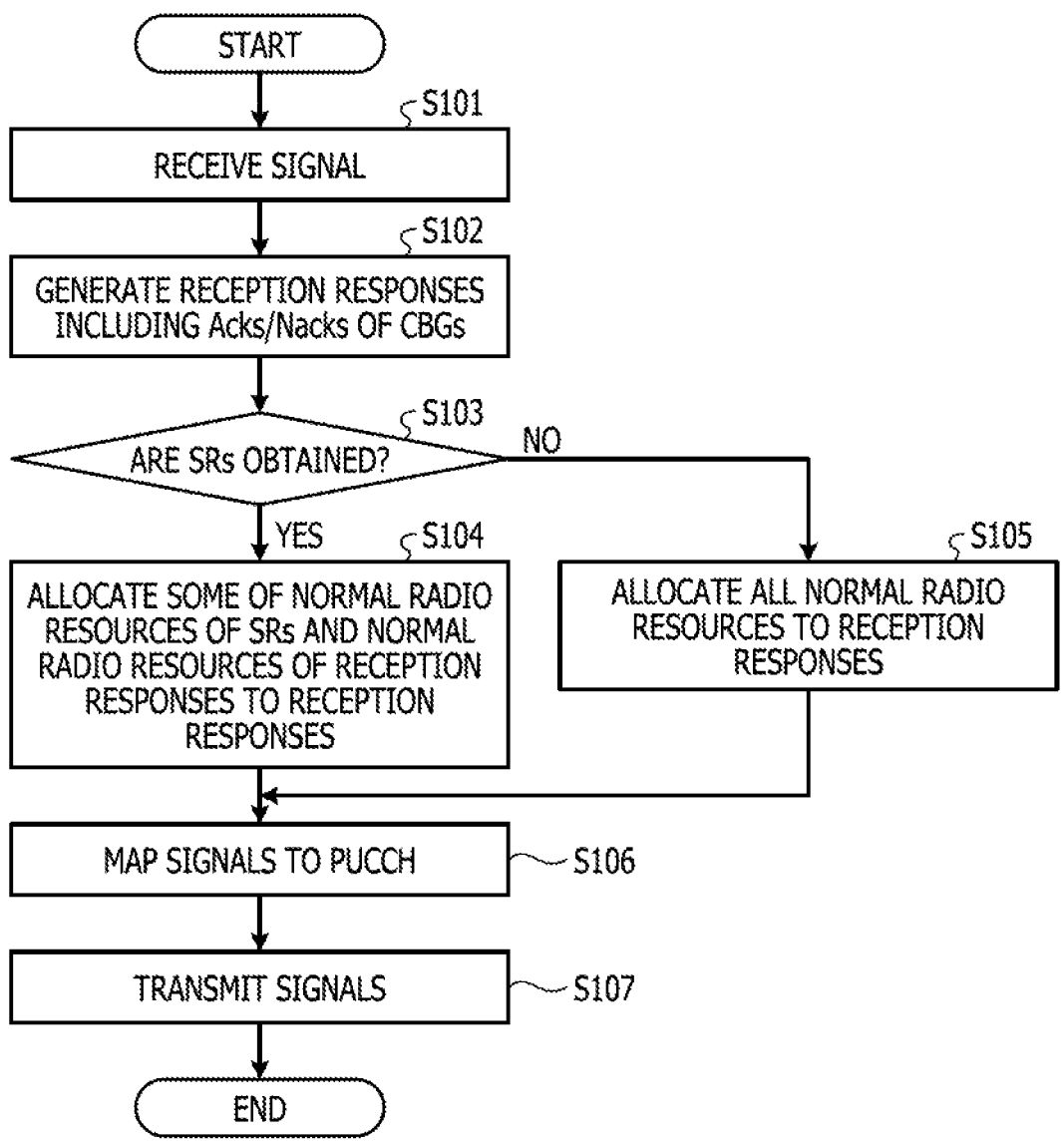
FIG. 9 is a flowchart illustrating the transmission of reception responses and radio resource allocation requests using the terminal apparatus according to Embodiment 1.

Next, a flow of the transmission of the reception responses and the radio resource allocation requests using the terminal apparatus 1 will be described with reference to FIG. 9. FIG. 9 is a flowchart illustrating the transmission of the reception responses and the radio resource allocation requests using the terminal apparatus according to Embodiment 1. Hereinafter, an example in which radio signals are received from the base station apparatus 2 will be described.

The PDSCH receiving unit 13 receives the signals transmitted from the base station apparatus 2 through the wireless unit 11 and the PDCCH receiving unit 12 (step S101).

The ACK/NACK generating unit 14 checks whether or not the reception of the signal has succeeded for each CBG 110 in the reception of the signals using the PDCCH receiving unit 12. The ACK/NACK generating unit 14 generates the reception responses including the Acks/Nacks of the CBGs 110 depending on whether or not the reception of the signal has succeeded for each obtained CBG 110 (step S102). The ACK/NACK generating unit 14 outputs the generated reception responses to the PUCCH generating unit 16.

The PUCCH generating unit 16 receives the reception responses including the Acks/Nacks of the CBGs 110 from the ACK/NACK generating unit 14. The PUCCH generating unit 16 determines whether or not the radio resource allocation requests are received depending on whether or not the radio resource allocation requests are obtained from the SR generating unit 15 (step S103).

In a case where the radio resource allocation requests are received (step S103: Yes), the PUCCH generating unit 16 performs coding and modulation on the obtained reception responses. The PUCCH generating unit 16 allocates some of the radio resources of the radio resource allocation requests and the radio resources of the reception responses in the normal allocation state to the coded and modulated reception responses (step S104).

In contrast, in a case where the radio resource allocation requests are not received (step S103: No), the PUCCH generating unit performs modulation and coding on the obtained reception responses, and allocates all the normal radio resources to the reception responses (step S105).

Thereafter, the PUCCH generating unit 16 maps the modulated and coded signals to the PUCCH according to the allocation of the radio resources (step S106). The PUCCH generating unit 16 outputs the modulated and coded signals to the wireless unit 11.

The wireless unit 11 receives the modulated and coded signals from the PUCCH generating unit 16. The wireless unit 11 performs DA conversion on the modulated and coded signals, and transmits the converted signals to the terminal apparatus 1 through the antenna (step S107).

Although it has been described in the present embodiment that the radio resource allocation requests and the reception responses are simultaneously transmitted, it is possible to reduce the transmission power by the same method even in a case where the radio resource allocation requests and other signals overlap each other. For example, it is possible to reduce the transmission power by the aforementioned method even in a case where the radio resource allocation requests and channel state information (CSI) feedbacks are simultaneously transmitted. For example, the PUCCH generating unit 16 may notify the base station of the generation of the radio resource allocation requests without transmitting the radio resource allocation requests by similarly performing the allocation of the radio resources to the CSI feedback and the allocation of the radio resources to the aforementioned reception responses. Accordingly, it is possible to reduce the transmission power.

As described above, the terminal apparatus according to the present embodiment transmits the reception responses by using some of the radio resources of the radio resource allocation requests and the radio resources of the reception responses in the normal allocation state in the case of the simultaneous transmission. Accordingly, the terminal apparatus according to the present embodiment notifies the base station apparatus of the generation of the Acks/Nacks of the CBGs and the radio resource allocation requests. Accordingly, the terminal apparatus may reduce the transmission power in the case of the simultaneous transmission. For example, the terminal apparatus according to the present embodiment may efficiently transmit the feedback information of the Ack/Nack or the information including the radio resource allocation requests. For example, in a case where the transmission power is insufficient when both the radio resource allocation requests and the reception responses are to be sent in the normal allocation state in the case of the simultaneous transmission, the terminal apparatus may send the reception responses within an upper limit of the transmission power and may notify the generation of the radio resource allocation requests.

Embodiment 2

Next, Embodiment 2 will be described. A terminal apparatus according to the present embodiment is different from Embodiment 1 in that some of the Acks/Nacks sent in the case of Embodiment 1 are transmitted at the time of the simultaneous transmission and the remaining Acks/Nacks are notified by mapping the transmitted Acks/Nacks. The terminal apparatus according to the present embodiment is also illustrated in the block diagram of FIG. 1. In the following description, the functions of the same units as those in Embodiment 1 will not be described.

The PUCCH generating unit 16 receives the information items of the reception responses from the ACK/NACK generating unit 14. The PUCCH generating unit 16 receives the radio resource allocation requests from the SR generating unit 15.

The PUCCH generating unit 16 determines whether or not the reception responses and the radio resource allocation requests are simultaneously transmitted. In a case where the reception responses and the radio resource allocation requests are not simultaneously transmitted, the PUCCH generating unit 16 performs coding and modulation on the data items indicating the reception responses or the radio resource allocation requests. Thereafter, the PUCCH generating unit 16 allocates the radio resources to the coded and modulated signals as in Embodiment 1.

Figure 10:
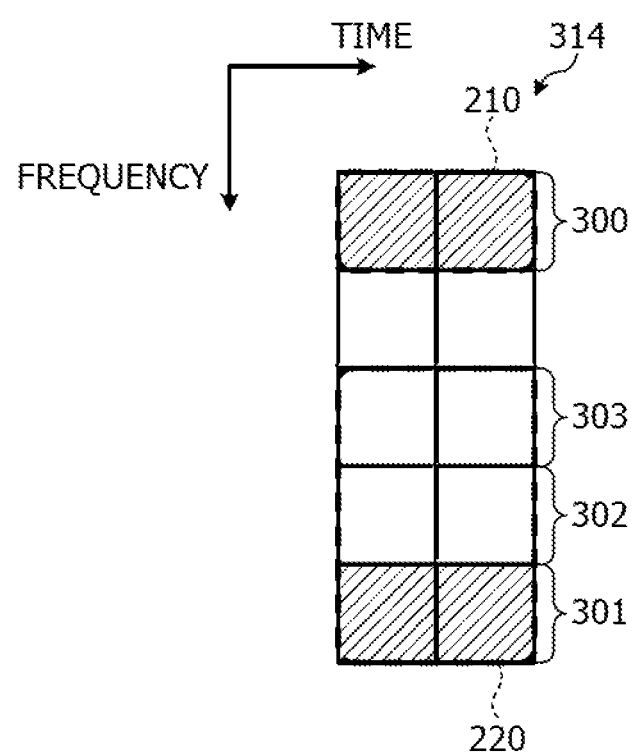
FIG. 10 illustrates the allocation of radio resources using a terminal apparatus according to Embodiment 2.

Next, a process using the PUCCH generating unit 16 in the case of the simultaneous transmission will be described. FIG. 10 illustrates the allocation of the radio resources using the terminal apparatus according to Embodiment 2. In an allocation state 314 in FIG. 10, a vertical direction represents frequency, and a horizontal direction represents time. In the case of the simultaneous transmission, the PUCCH generating unit 16 allocates the radio resources as represented in the allocation state 314.

For example, the PUCCH generating unit 16 stores the CBGs 110 over which data items directly indicating the corresponding Acks/Nacks is transmitted in advance. FIG. 11 illustrates an example of the Acks/Nacks of the CBGs. As illustrated as FIG. 11, CBGs #1 to #6 are present, and the PUCCH generating unit 16 stores the CBGs #1 to #4, as direct notification CBGs 401 over which the data items indicating the Acks/Nacks are transmitted, in advance. In this case, the PUCCH generating unit 16 stores the CBGs #5 and #6, as indirect notification CBGs 402 over which the notification of the Acks/Nacks is performed according to a mapping state of the information items of the Acks/Nacks of the CBGs #1 to #4, for example, a state of the non-use resource block, in advance.

Figure 12:
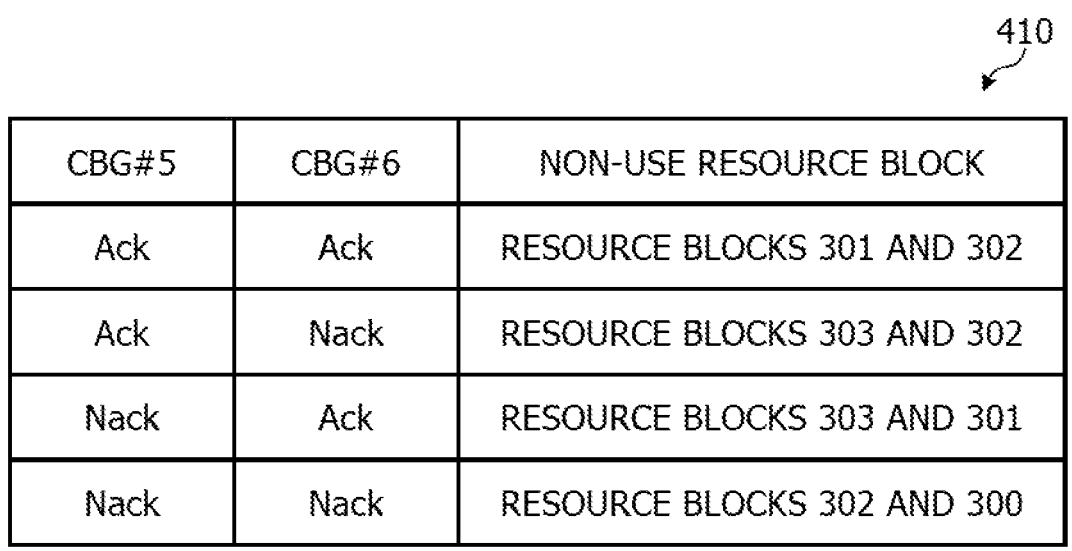
FIG. 12 illustrates an example of a non-use resource table.

The PUCCH generating unit 16 has a non-use resource table 410 in advance as illustrated as FIG. 12. FIG. 12 illustrates an example of the non-use resource table. The non-use resource table 410 represents the non-use resource blocks corresponding to the Acks/Nacks of the indirect notification CBGs.

The PUCCH generating unit 16 obtains the reception responses classified into the resource blocks indicating the Acks/Nacks of the direct notification CBGs 401 and the resource blocks indicating the information items of the Acks/Nacks of the indirect notification CBGs 402 from the ACK/NACK generating unit 14. The PUCCH generating unit 16 obtains the information items of the Acks/Nacks of the CBGs #5 and #6 which are the indirect notification CBGs 402 among the obtained reception responses. The PUCCH generating unit 16 obtains the combination of the non-use resource blocks corresponding to the Acks/Nacks of the CBGs #5 and #6 from the non-use resource table 410. For example, in a case where the Acks for the CBGs #5 and #6 are replied as illustrated as FIG. 11, the PUCCH generating unit 16 obtains the resource blocks 301 and 302 as the non-use resource blocks.

Subsequently, the PUCCH generating unit 16 allocates the radio resources 210 allocated to the radio resource allocation requests in the case of the normal allocation state and the resource blocks other than the non-use resource blocks to the reception responses indicating the Acks/Nacks of the CBGs #1 to #4. For example, in a case where the Acks for the CBGs #5 and #6 are replied, the PUCCH generating unit 16 allocates the resource blocks 300 corresponding to the radio resources 210 and the resource block 301 of the radio resources 220 to the reception responses of the CBGs #1 to #4. For example, the PUCCH generating unit 16 allocates the radio resources to the reception responses of the CBGs #1 to #4 as in the allocation state 314. In this case, the PUCCH generating unit 16 does not use the resource blocks 302 and 303.

The radio resources are allocated in this manner, and thus, the PUCCH generating unit 16 notifies the base station apparatus 2 of the generation of the SRs by adding the non-use resource blocks over which the Acks/Nacks are not transmitted to the normal radio resources. The PUCCH generating unit 16 reduces the number of signals to be transmitted.

The PUCCH generating unit 16 determines whether radio resource allocation requests to be transmitted are radio resource allocation requests for the transmission data items stored in the first buffer 181 or the second buffer 182. When the radio resource allocation requests to be transmitted are the radio resource allocation requests for transmitting the transmission data items stored in the first buffer 181, the PUCCH generating unit 16 increases the transmission power density of the radio resources allocated to the reception responses as in the allocation state 312. For example, in contrast, when the radio resource allocation requests to be transmitted are the radio resource allocation requests for transmitting the transmission data items in the low-priority process which are stored in the second buffer 182, the PUCCH generating unit 16 equalizes the transmission power density of the radio resources of the reception responses to the transmission power density at the time of the transmission of the normal reception responses as in the allocation state 312.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 notifies the base station apparatus 2 of the information items of the Acks/Nacks of the CBGs 110 and the generation of the radio resource allocation requests.

In the present embodiment, when the allocation in the normal allocation state is performed and transmission power is not insufficient even in the case of the simultaneous transmission, the PUCCH generating unit 16 may allocate the radio resources in the normal allocation state.

In this case, the ACK/NACK generating unit 14 recognizes whether any of the CBGs 110 is the direct notification CBG 401 or the indirect notification CBG 402 in advance. The ACK/NACK generating unit 14 generates the reception responses indicating the Acks/Nacks of the direct notification CBGs 401. The ACK/NACK generating unit 14 generates the reception responses indicating the information items of the Acks/Nacks of the indirect notification CBGs 402. The ACK/NACK generating unit 14 outputs the generated reception responses to the PUCCH generating unit 16.

The base station apparatus 2 according to the present embodiment is also illustrated in the block diagram of FIG. 8. In the following description, the functions of the same units as those in Embodiment 1 will not be described.

The uplink signal baseband processing unit 25 has the non-use resource table 410, similarly to the PUCCH generating unit 16 of the terminal apparatus 1. The uplink signal baseband processing unit 25 has the information items of the direct notification CBGs 401 and the indirect notification CBGs 402 of the CBGs 110 in advance.

The uplink signal baseband processing unit 25 receives the signals transmitted from the terminal apparatus 1 through the wireless unit 26. The uplink signal baseband processing unit 25 performs decoding and demodulation on the received signals. The uplink signal baseband processing unit 25 determines whether or not the information items of the Acks/Nacks are included in all the resource blocks of the radio resources 220 of the received signals. In a case where the information items of the Acks/Nacks are included in all the resource blocks of the radio resources 220 of the received signals, for example, in a case where the non-use resource block is not included, the uplink signal baseband processing unit 25 determines that the reception responses and the radio resource allocation requests are not simultaneously transmitted.

When the simultaneous transmission is not performed, the uplink signal baseband processing unit 25 obtains the information items of the Acks/Nacks of the CBGs 110 from the radio resources 220 which are the normal radio resources of the reception responses.

In contrast, in a case where the non-use resource block is included, the uplink signal baseband processing unit 25 recognizes the generation of the radio resource allocation requests. Subsequently, the uplink signal baseband processing unit 25 specifies the resource blocks to which the direct notification CBGs 401 are mapped in the radio resources 220 which are the normal radio resources of the reception responses. The uplink signal baseband processing unit 25 obtains the information items of the Acks/Nacks of the direct notification CBGs 401. The uplink signal baseband processing unit 25 determines the Acks/Nacks of the indirect notification CBGs 402 from the mapping of the non-use resource blocks of the radio resources 220 by using the non-use resource table 410.

In a case where the information items of the Acks/Nacks are not included in the resource blocks of any of the radio resources 220, the uplink signal baseband processing unit 25 determines whether or not the radio resource allocation requests are mapped to the radio resources 210. In a case where the radio resource allocation requests are mapped to the radio resources 210, the uplink signal baseband processing unit 25 recognizes the generation of the radio resource allocation requests. In contrast, in a case where the radio resource allocation requests are not mapped to the radio resources 210, the uplink signal baseband processing unit 25 determines that both the reception responses and the radio resource allocation requests are not received.

Thereafter, the uplink signal baseband processing unit 25 outputs the information items of the Acks/Nacks of the CBGs 110 to the scheduler 23. In a case where it is determined that the radio resource allocation requests are generated, the uplink signal baseband processing unit 25 notifies the scheduler 23 of the generation of the radio resource allocation requests.

Figure 13:
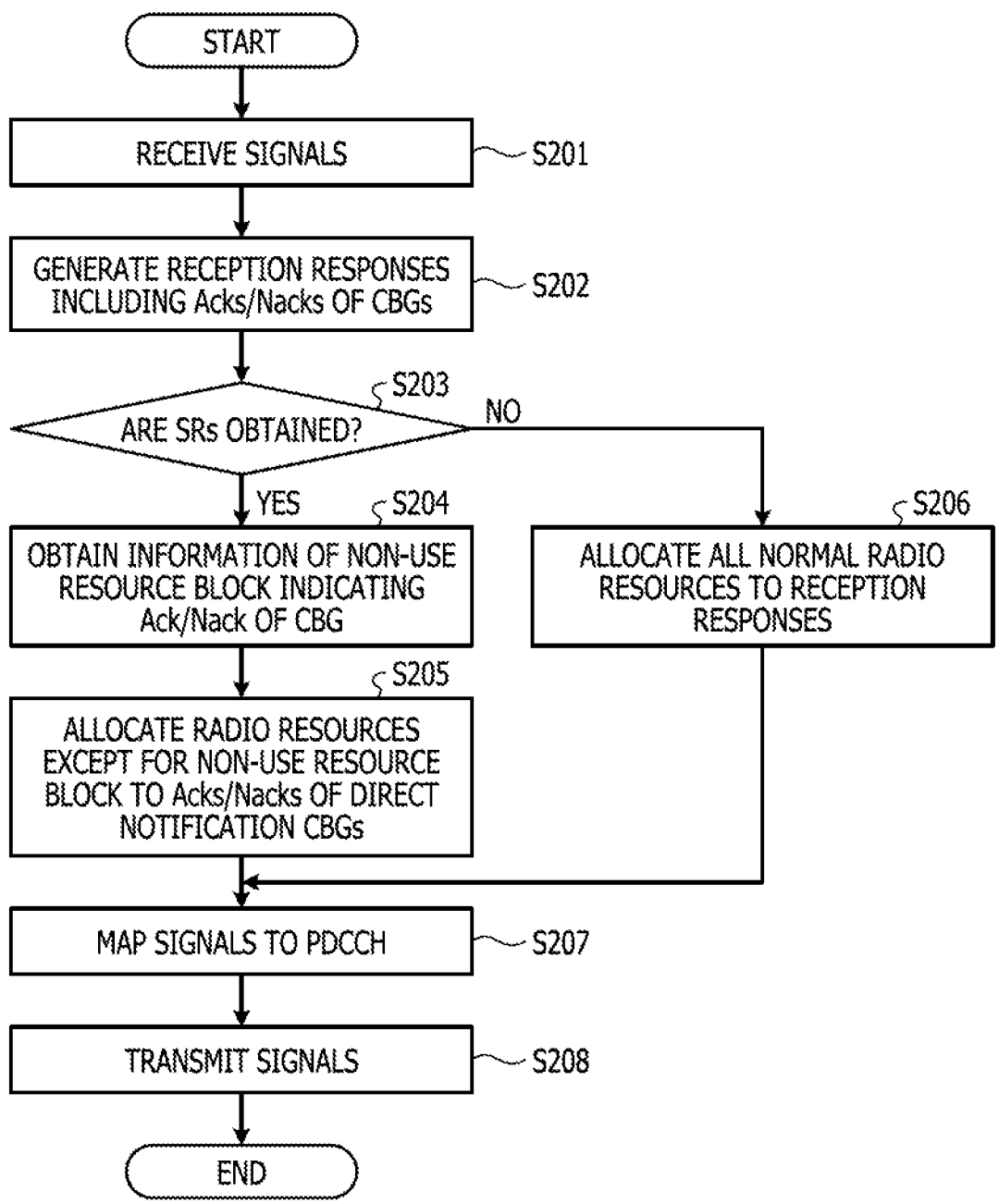
FIG. 13 is a flowchart illustrating the transmission of reception responses and radio resource allocation requests using the terminal apparatus according to Embodiment 2.

Next, a flow of the transmission of the reception responses and the radio resource allocation requests using the terminal apparatus 1 according to the present embodiment will be described with reference to FIG. 13. FIG. 13 is a flowchart illustrating the transmission of the reception responses and the radio resource allocation requests using the terminal apparatus according to Embodiment 2. Hereinafter, an example in which the radio signals are received from the base station apparatus 2 will be described.

The PDSCH receiving unit 13 receives the signals transmitted from the base station apparatus 2 through the wireless unit 11 and the PDCCH receiving unit 12 (step S201).

The ACK/NACK generating unit 14 checks whether or not the reception of the signal has succeeded for each CBG 110 in the reception of the signals using the PDCCH receiving unit 12. The ACK/NACK generating unit 14 generates the reception responses including the Acks/Nacks of the CBGs 110 depending on whether or not the reception of the signal has succeeded for each obtained CBG 110 (step S202). For example, the PDCCH receiving unit 12 generates the reception responses classified into the resource blocks indicating the Acks/Nacks of the direct notification CBGs 401 and the resource blocks indicating the information items of the Acks/Nacks of the indirect notification CBGs 402. The ACK/NACK generating unit 14 outputs the generated reception responses to the PUCCH generating unit 16.

The PUCCH generating unit 16 receives the reception responses including the Acks/Nacks of the CBGs 110 from the ACK/NACK generating unit 14. The PUCCH generating unit 16 determines whether or not the radio resource allocation requests are received depending on whether or not the radio resource allocation requests are obtained from the SR generating unit 15 (step S203).

In a case where the radio resource allocation requests are received (step S203: Yes), the PUCCH generating unit 16 obtains the information items of the non-use resource blocks indicating the Acks/Nacks of the indirect notification CBGs 402 by using the non-use resource table 410 (step S204).

The PUCCH generating unit 16 performs modulation and coding on the Acks/Nacks of the direct notification CBGs 401, and allocates the radio resources remaining by excluding the non-use resource blocks from the normal radio resources of the radio resource allocation requests and the reception responses (step S205).

In contrast, in a case where the radio resource allocation requests are received (step S203: No), the PUCCH generating unit 16 performs modulation and coding on the obtained reception responses, and allocates all the normal radio resources to the reception responses (step S206).

Thereafter, the PUCCH generating unit 16 maps the modulated and coded signals to the PDCCH according to the allocation of the radio resources (step S207). The PUCCH generating unit 16 outputs the modulated and coded signals to the wireless unit 11.

The wireless unit 11 receives the modulated and coded signals from the PUCCH generating unit 16. The wireless unit 11 performs DA conversion on the modulated and coded signals, and transmits the converted signals to the terminal apparatus 1 through the antenna (step S208).

As described above, the terminal apparatus according to the present embodiment transmits the signals directly indicating the Acks/Nacks of the direct notification CBGs to the base station apparatus, and notifies of the Acks/Nacks of the indirect notification CBGs by using the mapping of the Acks/Nacks of the direct notification CBGs. Accordingly, it is possible to efficiently transmit the feedback information items of the Acks/Nacks or the information items including the radio resource allocation requests. It is possible to further reduce the transmission power as compared to Embodiment 1.

Embodiment 3

Next, Embodiment 3 will be described. A terminal apparatus according to the present embodiment is different from Embodiment 1 in that CBG groups are generated by grouping the CBGS and Ack/Nack is notified to each CBG group at the time of the simultaneous transmission. In the present embodiment, the number of bits of the Ack/Nack feedback is reduced by increasing the number of corresponding CBs per bit of the Ack/Nack to be given as feedback at the time of the simultaneous transmission. The terminal apparatus according to the present embodiment is also illustrated in the block diagram of FIG. 1. In the following description, the functions of the same units as those in Embodiment 1 will not be described.

The PUCCH generating unit 16 receives the information items of the reception responses from the ACK/NACK generating unit 14. The PUCCH generating unit 16 receives the radio resource allocation requests from the SR generating unit 15.

The PUCCH generating unit 16 determines whether or not the reception responses and the radio resource allocation requests are simultaneously transmitted. In a case where the reception responses and the radio resource allocation requests are not simultaneously transmitted, the PUCCH generating unit 16 performs coding and modulation on the data indicating the reception responses or the radio resource allocation requests. Thereafter, the PUCCH generating unit 16 allocates the radio resources to the coded and modulated signals as in Embodiment 1.

Next, a process using the PUCCH generating unit 16 in the case of the simultaneous transmission will be described. FIG. 14 illustrates an example of the CBG groups generated by the PUCCH generating unit according to Embodiment 3. Hereinafter, a case where the CBGs #1 to #6 are also present will be described. The PUCCH generating unit 16 obtains the information items of the Acks/Nacks of the CBGs #1 to #6 from the reception responses obtained from the ACK/NACK generating unit 14.

The PUCCH generating unit 16 has information indicating a method of grouping the CBGs #1 to #6 in advance. The PUCCH generating unit 16 groups the CBGs #1 to #6 according to predetermined information. For example, as illustrated as FIG. 14, the PUCCH generating unit 16 generates a CBG group ##1 by grouping one CBG #1 and a CBG group ##2 by grouping one CBG #2, and generates a CBG group ##3 by grouping the CBGs #3 and #4 and a CBG group ##4 by grouping the CBGs #5 and #6.

In this case, the PUCCH generating unit 16 uses the logical sum of the Acks/Nacks of the CBGs 110 included in each group as the Acks/Nacks of each of the CBG Groups ##1 to ##4. For example, the PUCCH generating unit 16 respectively uses the Acks/Nacks of the CBGs #1 and #2 as the Acks/Nacks of the CBG groups ##1 and ##2 with no change. Since the responses of both the CBGs #3 and #4 are the Acks, the PUCCH generating unit 16 uses the Ack as the response of the CBG group ##3. Since the response of the CBG #5 is the Ack and the response of the CBG #6 is the Nack, the PUCCH generating unit 16 uses the Nack as the response of the CBG group ##4.

Figure 15:
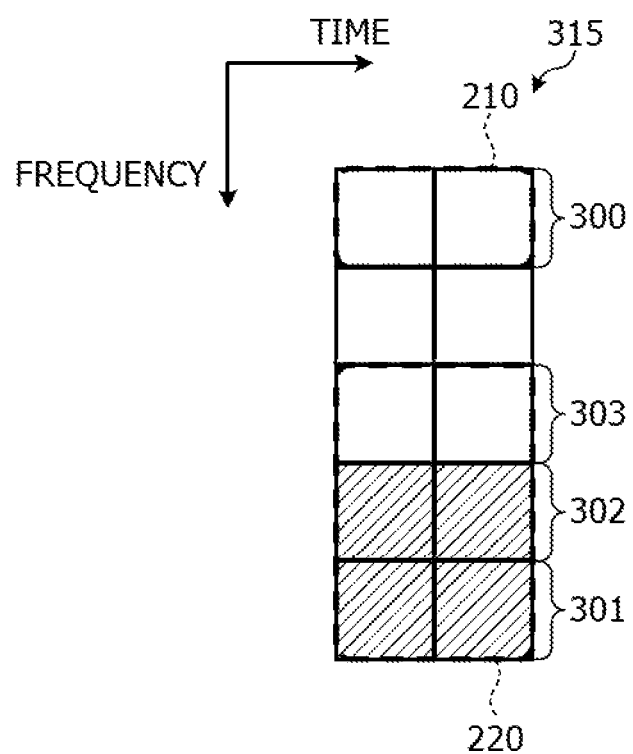
FIG. 15 illustrates the allocation of radio resources using a terminal apparatus according to Embodiment 3.

The PUCCH generating unit 16 allocates predetermined some resource blocks within the normal radio resources of the reception responses to the reception responses indicating the Acks/Nacks of the CBG groups ##1 to ##4, as represented in an allocation state 315 of FIG. 15. FIG. 15 illustrates the allocation of the radio resources using the terminal apparatus according to Embodiment 3. The PUCCH generating unit 16 allocates the resource blocks 302 and 301 of the radio resources 220 to the reception responses indicating the Acks/Nacks of the CBG groups ##1 to ##4, and uses the resource block 303 as the non-use resource block.

As stated above, the PUCCH generating unit 16 notifies the base station apparatus 2 of the generation of the SRs by adding the non-use resource block over which the Ack/Nack is not transmitted to the normal radio resources. The PUCCH generating unit 16 reduces the number of signals to be transmitted.

The PUCCH generating unit 16 changes the transmission power density depending on whether the radio resource allocation requests to be transmitted are the radio resource allocation requests for transmission data items stored in the first buffer 181 or the second buffer 182.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 notifies the base station apparatus 2 of the information items of the Acks/Nacks of the CBGs 110 and the generation of the radio resource allocation requests.

In the present embodiment, when the allocation in the normal allocation state is performed and the transmission power is not insufficient even in the case of the simultaneous transmission, the PUCCH generating unit 16 may allocate the radio resources in the normal allocation state.

The base station apparatus 2 according to the present embodiment is also illustrated in the block diagram of FIG. 8. In the following description, the functions of the same units as those in Embodiment 1 will not be described.

The uplink signal baseband processing unit 25 has information items of the CBGs 110 included in the CBG groups ##1 to ##4 in advance similarly to the PUCCH generating unit 16 of the terminal apparatus 1. The uplink signal baseband processing unit 25 has positions to which the Acks/Nacks of the CBG groups ##1 to ##4 are mapped in advance.

The uplink signal baseband processing unit 25 receives the signals transmitted from the terminal apparatus 1 through the wireless unit 26. The uplink signal baseband processing unit 25 performs decoding and demodulation on the received signals. The uplink signal baseband processing unit 25 determines whether or not the information items of the Acks/Nacks are included in all the resource blocks of the radio resources 220 of the received signals. In a case where the information items of the Acks/Nacks are included in all the resource blocks of the radio resources 220 of the received signals, for example, in a case where the non-use resource block is not included, the uplink signal baseband processing unit 25 determines that the reception responses and the radio resource allocation requests are not simultaneously transmitted.

In a case where the reception responses and the radio resource allocation requests are not simultaneously transmitted, the uplink signal baseband processing unit 25 obtains the information items of the Acks/Nacks of the CBGs #1 to #6 from the radio resources 220 which are the normal radio resources of the reception responses.

In contrast, in a case where the non-use resource block is included, the uplink signal baseband processing unit 25 recognizes the generation of the radio resource allocation requests. Subsequently, the uplink signal baseband processing unit 25 obtains the information items of the Acks/Nacks of the CBG groups ##1 to ##4 from the predetermined resource blocks of the radio resources 220 which are the normal radio resources of the reception responses. The uplink signal baseband processing unit 25 obtains the Acks/Nacks of the CBGs #1 to #6 from the information items of the Acks/Nacks of the CBG groups ##1 to ##4.

In a case where the information items of the Acks/Nacks are not included in all the resource blocks of the radio resources 220, the uplink signal baseband processing unit 25 determines whether or not the radio resource allocation requests are mapped to the radio resources 210. In a case where the radio resource allocation requests are mapped to the radio resources 210, the uplink signal baseband processing unit 25 recognizes the generation of the radio resource allocation requests. In contrast, in a case where the radio resource allocation requests are not mapped to the radio resources 210, the uplink signal baseband processing unit 25 determines that both the reception responses and the radio resource allocation requests are not received.

Thereafter, the uplink signal baseband processing unit 25 outputs the information items of the Acks/Nacks of the CBGs 110 to the scheduler 23. In a case where it is determined that the radio resource allocation requests are generated, the uplink signal baseband processing unit 25 notifies the scheduler 23 of the generation of the radio resource allocation requests.

Figure 16:
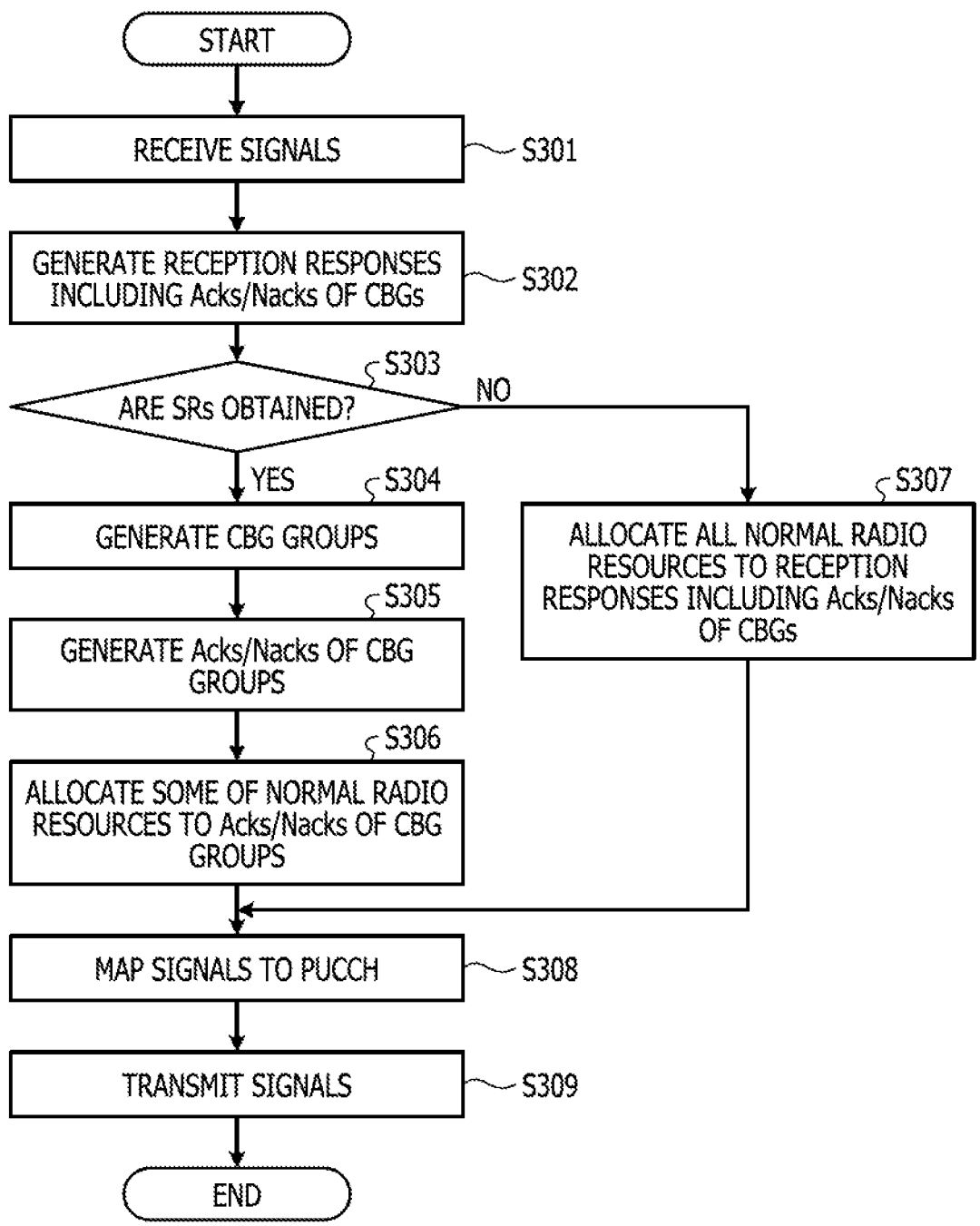
FIG. 16 is a flowchart illustrating the transmission of reception responses and radio resource allocation requests using the terminal apparatus according to Embodiment 3.

Next, a flow of the transmission of the reception responses and the radio resource allocation requests using the terminal apparatus 1 according to the present embodiment will be described with reference to FIG. 16. FIG. 16 is a flowchart illustrating the transmission of the reception responses and the radio resource allocation requests using the terminal apparatus according to Embodiment 3. Hereinafter, an example in which the radio signals are received from the base station apparatus 2 will be described.

The PDSCH receiving unit 13 receives the signals transmitted from the base station apparatus 2 through the wireless unit 11 and the PDCCH receiving unit 12 (step S301).

The ACK/NACK generating unit 14 checks whether or not the reception of the signal has succeeded for each CBG 110 in the reception of the signals using the PDCCH receiving unit 12. The ACK/NACK generating unit 14 generates the reception responses including the Acks/Nacks of the CBGs 110 depending on whether or not the reception of the signal has succeeded for each obtained CBG 110 (step S302). The ACK/NACK generating unit 14 outputs the generated reception responses to the PUCCH generating unit 16.

The PUCCH generating unit 16 receives the reception responses including the Acks/Nacks of the CBGs 110 from the ACK/NACK generating unit 14. The PUCCH generating unit 16 determines whether or not the radio resource allocation requests are received depending on whether or not the radio resource allocation requests are obtained from the SR generating unit 15 (step S303).

In a case where the radio resource allocation requests are received (step S303: Yes), the PUCCH generating unit 16 generates the CBG groups (step S304).

The PUCCH generating unit 16 obtains the logical sum of the Acks/Nacks of the CBGs 110 included in each CBG group, and generates the Acks/Nacks of the CBG groups (step S305).

The PUCCH generating unit 16 performs modulation and coding on the Acks/Nacks of the CBG groups, and allocates the radio resources to some of the normal radio resources of the reception responses (step S306).

In contrast, in a case where the radio resource allocation requests are received (step S303: No), the PUCCH generating unit 16 performs modulation and coding on the obtained reception responses, and allocates all the normal radio resources to the reception responses including the Acks/Nacks of the CBGs (step S307).

Thereafter, the PUCCH generating unit 16 maps the modulated and coded signals to the PUCCH according to the allocation of the radio resources (step S308). The PUCCH generating unit 16 outputs the modulated and coded signals to the wireless unit 11.

The wireless unit 11 receives the modulated and coded signals from the PUCCH generating unit 16. The wireless unit 11 performs DA conversion on the modulated and coded signals, and transmits the converted signals to the terminal apparatus 1 through the antenna (step S309).

As described above, the terminal apparatus according to the present embodiment notifies the base station apparatus of the Acks/Nacks of the CBG groups generated by grouping the CBGs. Accordingly, it is possible to efficiently transmit the feedback information items of the Acks/Nacks or the information items including the radio resource allocation requests. It is possible to further reduce the transmission power as compared to Embodiment 1.

Embodiment 4

Next, Embodiment 4 will be described. A terminal apparatus according to the present embodiment has functions obtained by combining the functions of Embodiment 2 and the functions of Embodiment 3. The terminal apparatus according to the present embodiment is also illustrated in the block diagram of FIG. 1. In the following description, the functions of the same units as those in Embodiment 1 will not be described.

A process using the PUCCH generating unit 16 according to the present embodiment in the case of the simultaneous transmission will be described. FIG. 17 illustrates an example of CBG groups generated by the PUCCH generating unit, the direct notification CBGs, and the indirect notification CBGs according to Embodiment 4. Hereinafter, a case where the CBGs #1 to #8 are also present will be described. The PUCCH generating unit 16 obtains the information items of the Acks/Nacks of the CBGs #1 to #8 from the reception responses obtained from the ACK/NACK generating unit 14.

The PUCCH generating unit 16 has information indicating a method of grouping the CBGs #1 to #8 in advance. The PUCCH generating unit 16 groups the CBGs #1 to #8 according to predetermined information. For example, as illustrated as FIG. 17, the PUCCH generating unit 16 generates CBG groups ##1 to ##4 by grouping the CBGs #1 and #2, the CBGs #3 and #4, the CBGs #5 and #6, and the CBGs #7 and #8, respectively. In this case, the PUCCH generating unit 16 uses the logical sum of the Acks/Nacks of the CBGs 110 included in each group as the Acks/Nacks of each of the CBG Groups ##1 to ##4.

The PUCCH generating unit 16 uses the CBG groups ##1 and ##2, as direct notification CBG groups 403. The PUCCH generating unit 16 uses the CBG groups ##3 and ##4, as indirect notification CBG groups 404.

The PUCCH generating unit 16 has a use resource table 411 illustrated as FIG. 18. FIG. 18 illustrates an example of the use resource table. Although the PUCCH generating unit 16 uses the table in which use resource blocks are registered, the table in which the non-use resource blocks are registered may be used as in Embodiment 2. The PUCCH generating unit 16 specifies the use resource blocks indicating the information items of the Acks/Nacks of the CBG groups ##3 and ##4 which are the indirect notification CBG groups 404 by using the use resource table 411. For example, in a case where the Acks/Nacks of the CBG groups ##1 to ##4 illustrated as FIG. 17 are in the state illustrated in FIG. 17, the resource block 303 is the use resource block.

Figure 19:
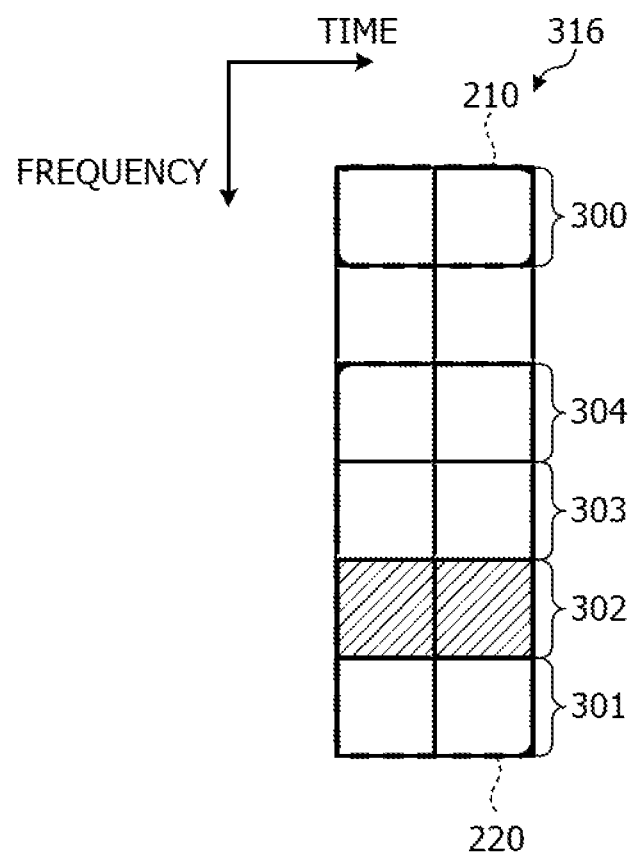
FIG. 19 illustrates the allocation of radio resources using a terminal apparatus according to Embodiment 4.

As illustrated in an allocation state 316 of FIG. 19, the PUCCH generating unit 16 allocates predetermined some resource blocks within the normal radio resources of the reception responses to the reception responses indicating the Acks/Nacks of the CBG groups ##1 and ##2. FIG. 19 illustrates the allocation of the radio resources using the terminal apparatus according to Embodiment 4. The PUCCH generating unit 16 allocates the resource block 302 specified as the use resource block to the reception responses indicating the Acks/Nacks of the CBG groups ##1 and ##2, and uses the resource blocks 301, 303, and 304, as the non-use resource blocks.

The radio resources are allocated in this manner, and thus, the PUCCH generating unit 16 notifies the base station apparatus 2 of the generation of the SRs by adding the non-use resource blocks in which the Ack/Nack is not transmitted to the normal radio resources. The PUCCH generating unit 16 reduces the number of signals to be transmitted.

The PUCCH generating unit 16 changes the transmission power density depending on whether the radio resource allocation requests to be transmitted are the radio resource allocation requests for transmission data items stored in the first buffer 181 or the second buffer 182.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 notifies the base station apparatus 2 of the information items of the Acks/Nacks of the CBGs 110 and the generation of the radio resource allocation requests.

In the present embodiment, when the allocation in the normal allocation state is performed and the transmission power is not insufficient even in the case of the simultaneous transmission, the PUCCH generating unit 16 may allocate the radio resources in the normal allocation state.

The base station apparatus 2 according to the present embodiment is also illustrated in the block diagram of FIG. 8. In the following description, the functions of the same units as those in Embodiment 1 will not be described.

The uplink signal baseband processing unit 25 has information items of the CBGs 110 included in the CBG groups ##1 to ##4 in advance similarly to the PUCCH generating unit 16 of the terminal apparatus 1. The uplink signal baseband processing unit 25 has positions to which the Acks/Nacks of the direct notification CBG groups 403 are mapped in advance.

The uplink signal baseband processing unit 25 receives the signals transmitted from the terminal apparatus 1 through the wireless unit 26. The uplink signal baseband processing unit 25 performs decoding and demodulation on the received signals. In a case where the non-use resource blocks are included in the radio resources 220 of the received signals, the uplink signal baseband processing unit 25 recognizes the generation of the radio resource allocation requests. Subsequently, the uplink signal baseband processing unit 25 obtains the Acks/Nacks of the direct notification CBG groups 403 from the predetermined resource blocks of the radio resources 220 which are the normal radio resources of the reception responses. Subsequently, the uplink signal baseband processing unit 25 obtains the Acks/Nacks of the indirect notification CBG groups 404 from the positions to which the Acks/Nacks of the direct notification CBG groups 403 are mapped. Thereafter, the uplink signal baseband processing unit 25 obtains the Acks/Nacks of the CBGs #1 to #6 from the information items of the Acks/Nacks of the CBG groups ##1 to ##4.

As described above, the terminal apparatus classifies according to the present embodiment the CBG groups obtained by grouping the CBGs into the direction notification CBG groups and the indirect notification CBG groups. The terminal apparatus according to the present embodiment also notifies the base station apparatus of the Acks/Nacks of the indirect notification CBG groups by notifying the base station apparatus of the Acks/Nacks of the direct notification CBG groups. Accordingly, it is possible to efficiently transmit the feedback information items of the Acks/Nacks or the information items including the radio resource allocation requests. It is possible to further reduce the transmission power as compared to Embodiment 1.

Embodiment 5

Next, Embodiment 5 will be described. A terminal apparatus according to the present embodiment classifies the CBGs into the direct notification CBGs and the indirect notification CBGs until the radio resource allocation requests are used with no change at the time of the simultaneous transmission, and notifies the base station apparatus of the Acks/Nacks of the indirect notification CBGs in the positions of the Acks/Nacks of the direct notification CBGs. The terminal apparatus according to the present embodiment is also illustrated in the block diagram of FIG. 1. In the following description, the functions of the same units as those in Embodiment 1 will not be described.

Figure 20:
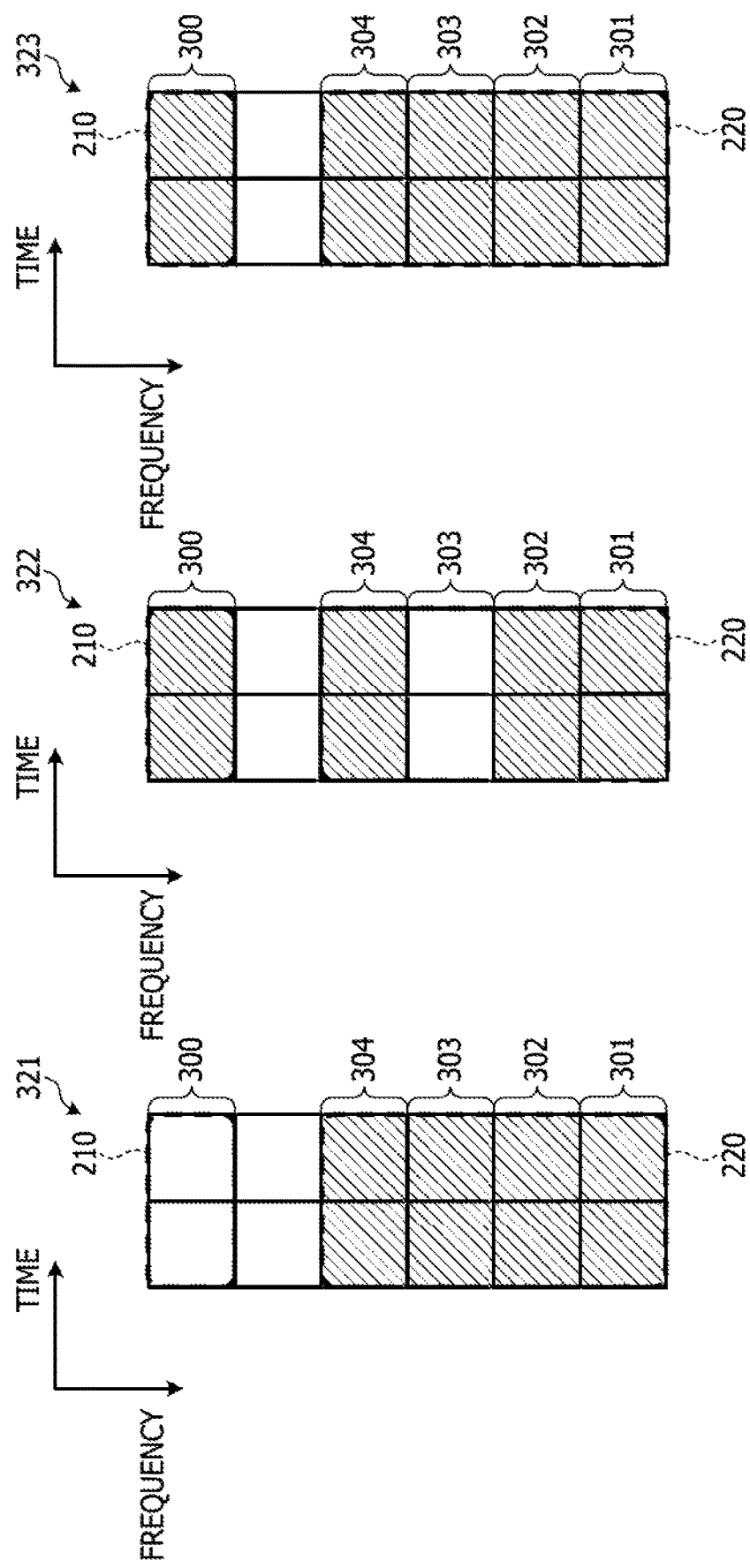
FIG. 20 illustrates the allocation of radio resources using a terminal apparatus according to Embodiment 5.

FIG. 20 illustrates the allocation of the radio resources using the terminal apparatus according to Embodiment 5. In allocation states 321 to 323 in FIG. 20, a vertical direction represents frequency, and a horizontal direction represents time.

In the present embodiment, in a case where the reception responses and the radio resource allocation requests are not simultaneously transmitted and the reception responses are sent, the PUCCH generating unit 16 allocates all the normal radio resources to the reception responses as represented in the allocation state 321.

In contrast, in the case of the simultaneous transmission, the PUCCH generating unit 16 allocates the radio resources 210 which are the normal radio resources of the radio resource allocation requests in the allocation state 322 to the radio resource allocation requests. The PUCCH generating unit 16 classifies the CBGs 110 into the direct notification CBGs 401 and the indirect notification CBGs 402. The PUCCH generating unit 16 allocates some of the radio resources 220 in the allocation state 322 to the Acks/Nacks of the direct notification CBGs 401 so as to represent the Acks/Nacks of the indirect notification CBGs 402.

Accordingly, the PUCCH generating unit 16 allocates the resource blocks 301, 302, and 304 to the Acks/Nacks of the direct notification CBGs 401. In this case, the PUCCH generating unit 16 notifies the base station apparatus of the Acks/Nacks of the indirect notification CBGs 402 by using the resource block 303 as the non-use resource block.

As stated above, the PUCCH generating unit 16 reduces the number of signals to be transmitted by adding the non-use resource blocks over which the Acks/Nacks are not transmitted to the normal radio resources, and reduces the transmission power.

The PUCCH generating unit 16 changes the transmission power density of the radio resources 210 depending on whether or not the radio resource allocation requests to be transmitted are the radio resource allocation requests for transmission data items stored in the first buffer 181 or the second buffer 182. The PUCCH generating unit 16 transmits the data items of the radio resource allocation requests and the reception responses to the base station apparatus 2 through the wireless unit 11 with the determined transmission power density by using the allocated radio resources.

In the present embodiment, when the allocation in the normal allocation state is performed and the transmission power is not insufficient even in the case of the simultaneous transmission, the PUCCH generating unit 16 may allocate the radio resources in the normal allocation state as represented in the allocation state 323.

The base station apparatus 2 according to the present embodiment is also illustrated in the block diagram of FIG. 8. In the following description, the functions of the same units as those in Embodiment 1 will not be described.

The uplink signal baseband processing unit 25 receives the signals transmitted from the terminal apparatus 1 through the wireless unit 26. The uplink signal baseband processing unit 25 performs decoding and demodulation on the received signals. The uplink signal baseband processing unit 25 determines whether or not the reception responses and the radio resource allocation requests are simultaneously transmitted from the received signals. When the reception responses and the radio resource allocation requests are simultaneously transmitted, the uplink signal baseband processing unit 25 obtains the radio resource allocation requests or the Acks/Nacks of the CBGs 110.

In contrast, in the case of the simultaneous reception, the uplink signal baseband processing unit 25 initially obtains the radio resource allocation requests. Subsequently, the uplink signal baseband processing unit 25 obtains the information items of the Acks/Nacks of the direct notification CBGs 401 from the radio resources 220 of the received signals. The uplink signal baseband processing unit 25 obtains the Acks/Nacks of the indirect notification CBGs 402 from the mapping state of the direct notification CBGs 401.

Thereafter, the uplink signal baseband processing unit 25 outputs the information items of the Acks/Nacks of the CBGs 110 to the scheduler 23. In a case where it is determined that the radio resource allocation requests are generated, the uplink signal baseband processing unit 25 notifies the scheduler 23 of the generation of the radio resource allocation requests.

As described above, the terminal apparatus according to the present embodiment transmits the radio resource allocation requests by using the normal radio resources, and transmits the reception responses by using the direct notification CBGs and the indirect notification CBGs. Accordingly, it is possible to efficiently transmit the feedback information items of the Acks/Nacks or the information items including the radio resource allocation requests. It is possible to reduce the transmission power.

Although it has been described that the transmission power is reduced at the time of the simultaneous transmission of the radio resource allocation requests and the reception responses, a case where the transmission power is reduced at the time of simultaneous transmission of the radio resource allocation requests and other signals may be realized by using the aforementioned method. For example, in a case where there are high-priority reception responses for the URLLC and low-priority reception responses for the EMBB as the reception responses, it is possible to reduce the transmission power by using the aforementioned method.

For example, the PUCCH generating unit 16 allocates the normal radio resources to the reception responses for the URLLC, similarly to the aforementioned radio resource allocation requests. Similarly to the aforementioned reception responses, the PUCCH generating unit 16 transmits the reception responses for the EMBB by using the direct notification CBGs 401 and the indirect notification CBGs 402. Accordingly, the PUCCH generating unit 16 may reduce the number of bits to be used for the reception responses for the EMBB, and may reduce the transmission power. The PUCCH generating unit 16 may allocate the reduced power to the reception responses for the URLLC, and may improve the reliability of the reception responses for the URLLC.

The same method may be used for the simultaneous transmission of the radio resource allocation requests, the reception responses for the URLLC, and the reception responses for the EMBB. In this case, the PUCCH generating unit 16 allocates the normal radio resources to the radio resource allocation requests and the reception responses for the URLLC, similarly to the aforementioned radio resource allocation requests. Similarly to the aforementioned reception responses, the PUCCH generating unit 16 transmits the reception responses for the EMBB by using the direct notification CBGs 401 and the indirect notification CBGs 402. Accordingly, the PUCCH generating unit 16 may reduce the number of bits to be used for the reception responses for the EMBB, and may reduce the transmission power. The PUCCH generating unit 16 may allocate the reduced power to the radio resource allocation requests and the reception responses for the URLLC, and may improve the reliability thereof.

Embodiment 6

Next, Embodiment 6 will be described. A terminal apparatus according to the present embodiment transmits the radio resource allocation requests with no change at the time of the simultaneous transmission, as in Embodiment 5. The terminal apparatus according to the present embodiment groups the CBGs, and notifies the base station apparatus of the Acks/Nacks of the CBG groups. The terminal apparatus according to the present embodiment is also illustrated in the block diagram of FIG. 1. In the following description, the functions of the same units as those in Embodiment 1 will not be described.

A process using the PUCCH generating unit 16 in the case of the simultaneous transmission will be described. FIG. 21 is a diagram illustrating an example of the CBG groups generated by the PUCCH generating unit according to Embodiment 6. Hereinafter, a case where the CBGs #1 to #6 are also present will be described. The PUCCH generating unit 16 obtains the information items of the Acks/Nacks of the CBGs #1 to #6 from the reception responses obtained from the ACK/NACK generating unit 14.

The PUCCH generating unit 16 has information indicating a method of grouping the CBGs #1 to #6 in advance. The PUCCH generating unit 16 groups the CBGs #1 to #6 according to predetermined information. For example, as illustrated as FIG. 21, the PUCCH generating unit 16 generates CBG groups ##1 and ##2 by grouping the CBGs #1 to #3, and the CBGs #4 to #6, respectively.

In this case, the PUCCH generating unit 16 uses the logical sum of the Acks/Nacks of the CBGs 110 included in each group as the Acks/Nacks of each of the CBG Groups ##1 and ##2.

Figure 22:
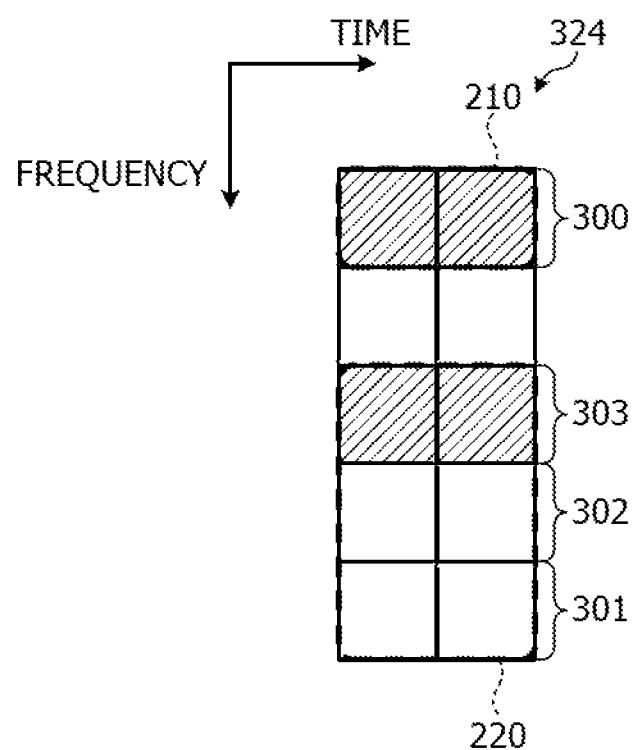
FIG. 22 illustrates the allocation of radio resources using a terminal apparatus according to Embodiment 6.

As represented in an allocation state 324 of FIG. 22, the PUCCH generating unit 16 allocates the radio resources 210 which are the normal radio resources of the radio resource allocation requests to the radio resource allocation requests. The PUCCH generating unit 16 allocates predetermined some resource blocks within the normal radio resources of the reception responses to the reception responses indicating the Acks/Nacks of the CBG groups ##1 and ##2. FIG. 22 illustrates the allocation of the radio resources using the terminal apparatus according to Embodiment 6. The PUCCH generating unit 16 allocates the resource block 303 of the radio resources 220 to the reception responses indicating the Acks/Nacks of the CBG groups ##1 and ##2, and uses the resource blocks 301 and 302 as the non-use resource blocks.

As stated above, the PUCCH generating unit 16 reduces the number of signals to be transmitted by adding the non-use resource blocks over which the Acks/Nacks are not transmitted to the normal radio resources, and reduces the transmission power.

The PUCCH generating unit 16 changes the transmission power density depending on whether the radio resource allocation requests to be transmitted are the radio resource allocation requests for transmission data items stored in the first buffer 181 or the second buffer 182.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 transmits the information items of the Acks/Nacks of the CBGs 110 and the generation of the radio resource allocation requests to the base station apparatus 2.

In the present embodiment, when the allocation in the normal allocation state is performed and transmission power is not insufficient even in the case of the simultaneous transmission, the PUCCH generating unit 16 may allocate the radio resources in the normal allocation state.

The PUCCH generating unit 16 changes the transmission power density of the radio resources 210 depending on whether or not the radio resource allocation requests to be transmitted are the radio resource allocation requests for transmission data items stored in the first buffer 181 or the second buffer 182. The PUCCH generating unit 16 transmits the data items of the radio resource allocation requests and the reception responses to the base station apparatus 2 through the wireless unit 11 with the determined transmission power density by using the allocated radio resources.

In the present embodiment, when the allocation in the normal allocation state is performed and transmission power is not insufficient even in the case of the simultaneous transmission, the PUCCH generating unit 16 may allocate the radio resources in the normal allocation state.

As described above, the terminal apparatus according to the present embodiment transmits the radio resource allocation requests by using the normal radio resource resources, and transmits the reception responses by using the CBG groups. Accordingly, it is possible to efficiently transmit the feedback information items of the Acks/Nacks or the information items including the radio resource allocation requests. It is possible to reduce the transmission power.

Although it has been described that the transmission power is reduced at the time of the simultaneous transmission of the radio resource allocation requests and the reception responses, a case where the transmission power is reduced at the time of simultaneous transmission of the radio resource allocation requests and other signals may be realized by using the aforementioned method as in Embodiment 5. For example, in a case where there are high-priority reception responses for the URLLC and low-priority reception responses for the EMBB as the reception responses, it is possible to reduce the transmission power by using the aforementioned method.

For example, the PUCCH generating unit 16 allocates the normal radio resources to the reception responses for the URLLC, similarly to the aforementioned radio resource allocation requests. The PUCCH generating unit 16 transmits the reception responses for the EMBB by using the CBG groups, similarly to the aforementioned reception responses. Accordingly, the PUCCH generating unit 16 may reduce the number of bits to be used for the reception responses for the EMBB, and may reduce the transmission power. The PUCCH generating unit 16 may allocate the reduced power to the reception responses for the URLLC, and may improve the reliability of the reception responses for the URLLC.

The same method may be used for the simultaneous transmission of the radio resource allocation requests, the reception responses for the URLLC, and the reception responses for the EMBB.

Embodiment 7

Next, Embodiment 7 will be described. A terminal apparatus according to the present embodiment transmits the radio resource allocation requests with no change at the time of the simultaneous transmission, as in Embodiment 5. The terminal apparatus according to the present embodiment uses the resource block having a larger number of information items of the Nacks among the resource blocks over which the reception responses are transmitted, as a non-transmission resource block. The terminal apparatus according to the present embodiment is also illustrated in the block diagram of FIG. 1. In the following description, the functions of the same units as those in Embodiment 1 will not be described.

Figure 23:
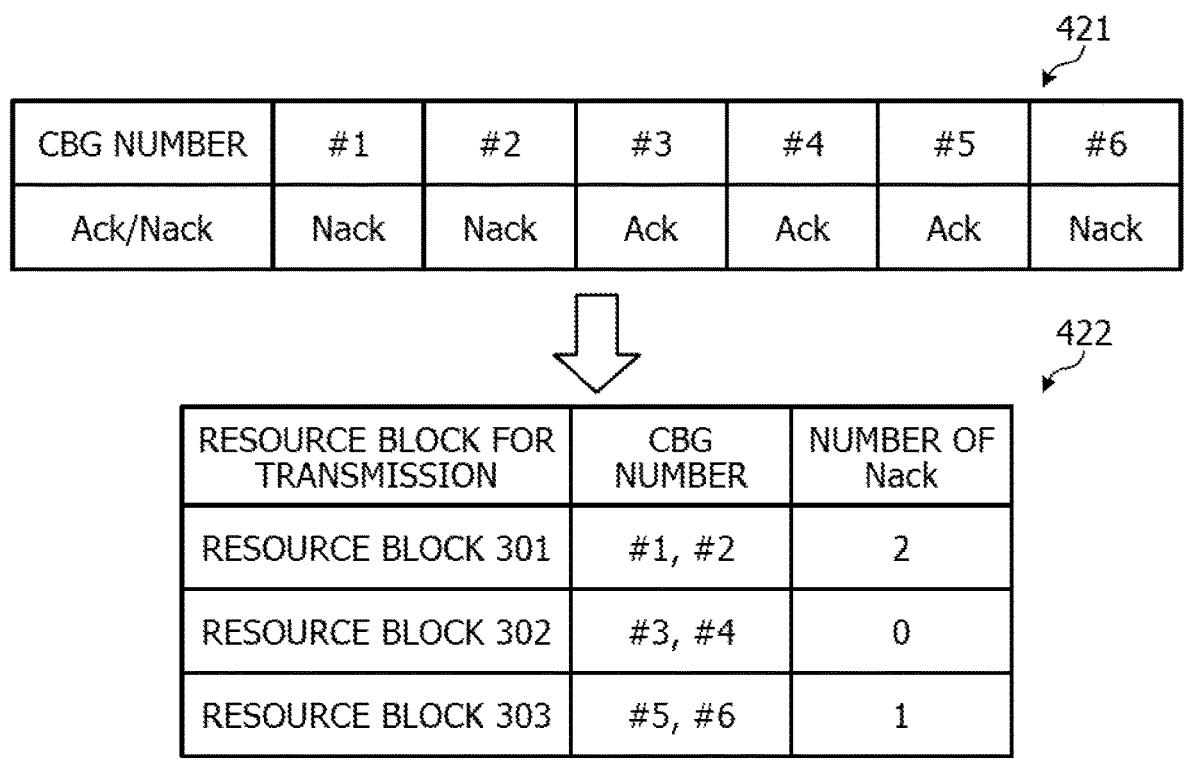
FIG. 23 is a diagram for describing the calculation of the number of Nacks in each resource block.

A process using the PUCCH generating unit 16 in the case of the simultaneous transmission will be described. FIG. 23 is a diagram for describing the calculation of the number of Nacks in each resource block. Hereinafter, a case where the CBGs #1 to #6 are also present will be described.

For example, the PUCCH generating unit 16 obtains the information items of the Acks/Nacks of the CBGs #1 to #6 represented by Ack/Nack information 421 of FIG. 23. Subsequently, the PUCCH generating unit 16 specifies the resource blocks 301 to 303 to be allocated to the information items of the Acks/Nacks of the CBGs #1 to #6 in the normal allocation state. As represented in Table 422, the resource block 301 is allocated to the CBGs #1 and #2. The resource block 302 is allocated to the CBGs #3 and #4. The resource block 303 is allocated to the CBGs #5 and #6.

Subsequently, the PUCCH generating unit 16 obtains the number of Nacks of the CBGs #1 to #6 corresponding to the resource blocks 301 to 303. The number of Nacks in the resource block 301 is 2, the number of Nacks in the resource block 302 is 0, and the number of Nacks in the resource block 303 is 1.

Figure 24:
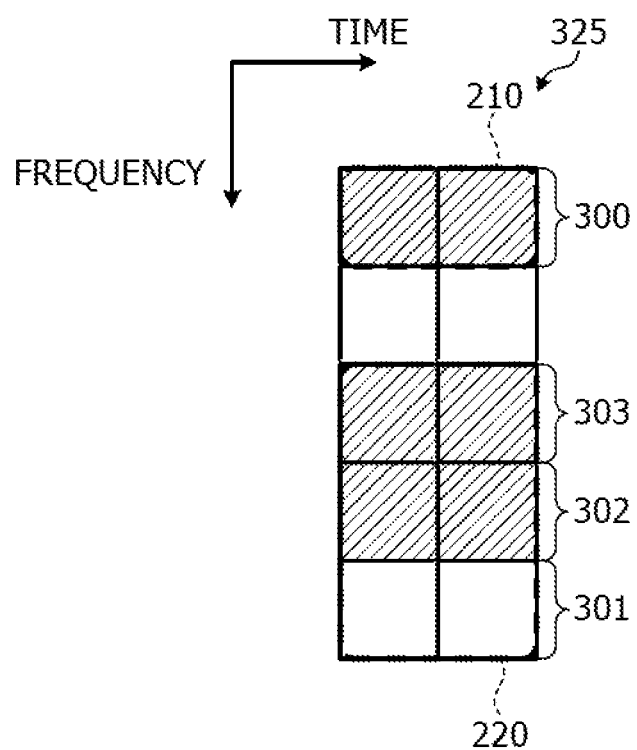
FIG. 24 illustrates the allocation of radio resources using a terminal apparatus according to Embodiment 7.

The PUCCH generating unit 16 uses the resource block 301 having the largest number of Nacks as the non-use resource block. The PUCCH generating unit 16 allocates the radio resources as represented in an allocation state 325 of FIG. 24. FIG. 24 illustrates the allocation of the radio resources using the terminal apparatus according to Embodiment 7.

For example, the PUCCH generating unit 16 allocates the radio resources 210 which are the normal radio resources of the radio resource allocation requests to the radio resource allocation requests. The PUCCH generating unit 16 performs the same allocation as the allocation in the normal allocation state by using the resource blocks 302 and 303 other than the resource block 301 used as the non-use resource block.

As stated above, the PUCCH generating unit 16 reduces the number of signals to be transmitted by adding the non-use resource block over which the Acks/Nacks are not transmitted to the normal radio resources, and reduces the transmission power.

The PUCCH generating unit 16 changes the transmission power density depending on whether the radio resource allocation requests to be transmitted are the radio resource allocation requests for transmission data items stored in the first buffer 181 or the second buffer 182.

Thereafter, the PUCCH generating unit 16 transmits data items of the reception responses to the base station apparatus 2 through the wireless unit 11 with the determined transmission power density by using the allocated radio resources. Accordingly, the PUCCH generating unit 16 transmits the information items of the Acks/Nacks of the CBGs #3 and #4 other than the information items of the Acks/Nacks of the CBGs #1 and #2 and the radio resource allocation requests to the base station apparatus 2.

In a case where the Nack is replied, the base station apparatus 2 retransmits the data for which the Nack is replied. In a case where the response is not replied, the base station apparatus 2 also retransmits the data for which the response is not replied. For example, even though the terminal apparatus 1 does not reply the Nack, since the data is retransmitted by the base station apparatus 2, the substantially same process as the process in a case where the Ack/Nack is replied may be performed even though the Ack/Nack is not replied over the resource block having a large number of Nacks. Thus, in the present embodiment, the PUCCH generating unit 16 uses the resource block having a large number of Nacks, as the non-use resource block.

In the present embodiment, when the allocation in the normal allocation state is performed and transmission power is not insufficient even in the case of the simultaneous transmission, the PUCCH generating unit 16 may allocate the radio resources in the normal allocation state.

The PUCCH generating unit 16 changes the transmission power density of the radio resources 210 depending on whether or not the radio resource allocation requests to be transmitted is the radio resource allocation requests for transmission data items stored in the first buffer 181 or the second buffer 182. The PUCCH generating unit 16 transmits the data items of the radio resource allocation requests and the reception responses to the base station apparatus 2 through the wireless unit 11 with the determined transmission power density by using the allocated radio resources.

Figure 25:
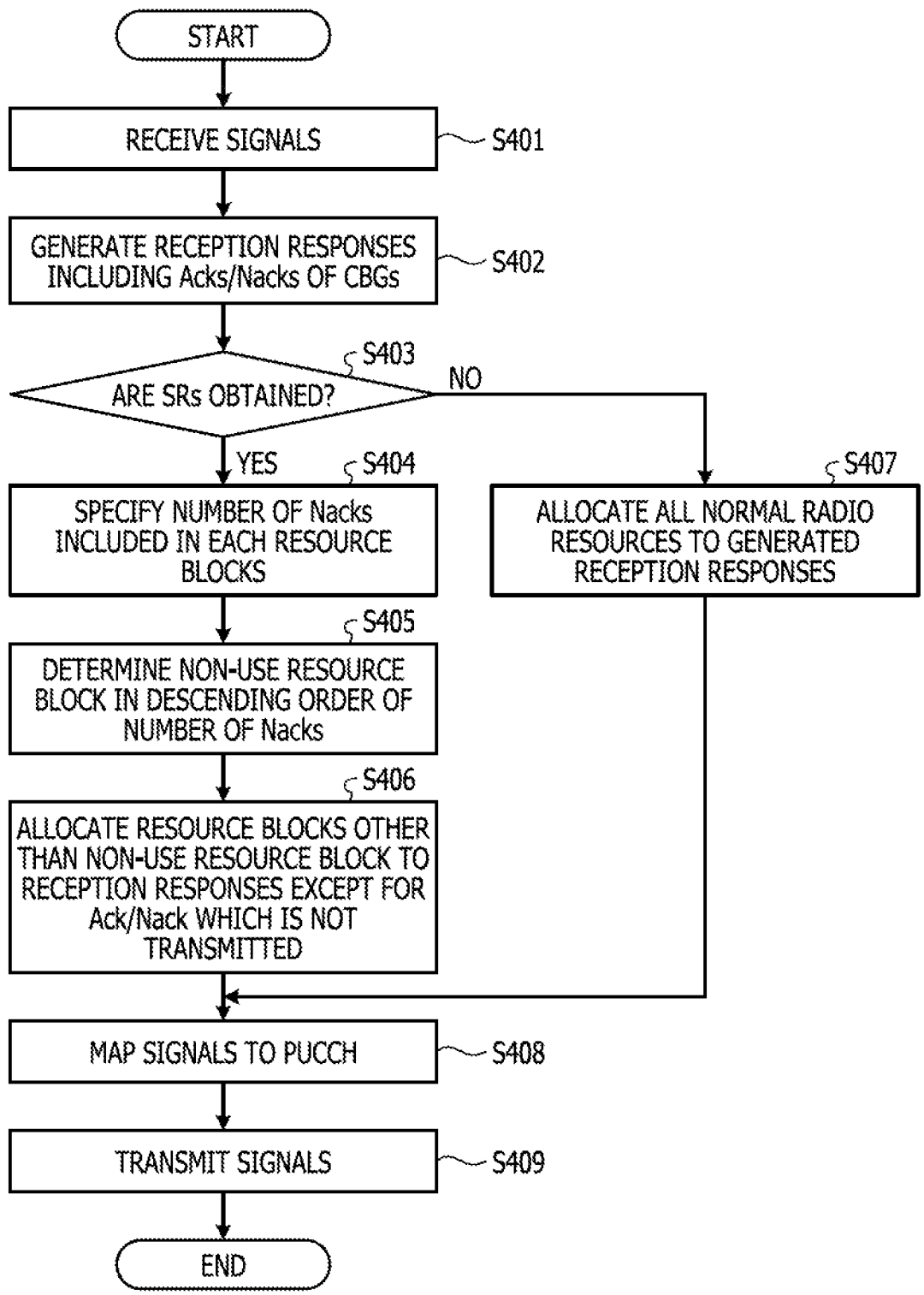
FIG. 25 is a flowchart illustrating the transmission of reception responses and radio resource allocation requests using the terminal apparatus according to Embodiment 7.

In the present embodiment, when the allocation in the normal allocation state is performed and transmission power is not insufficient even in the case of the simultaneous transmission, the PUCCH generating unit 16 may allocate the radio resources in the normal allocation state.

a flow of the transmission of the reception responses and the radio resource allocation requests using the terminal apparatus 1 according to the present embodiment will be described with reference to FIG. 25. FIG. 25 is a flowchart illustrating the transmission of the reception responses and the radio resource allocation requests using the terminal apparatus according to Embodiment 7. Hereinafter, an example in which the radio signals are received from the base station apparatus 2 will be described.

The PDSCH receiving unit 13 receives the signals transmitted from the base station apparatus 2 through the wireless unit 11 and the PDCCH receiving unit 12 (step S401).

The ACK/NACK generating unit 14 checks whether or not the reception of the signal has succeeded for each CBG 110 in the reception of the signals using the PDCCH receiving unit 12. The ACK/NACK generating unit 14 generates the reception responses including the Acks/Nacks of the CBGs 110 depending on whether or not the reception of the signal has succeeded for each obtained CBG 110 (step S402). The ACK/NACK generating unit 14 outputs the generated reception responses to the PUCCH generating unit 16.

The PUCCH generating unit 16 receives the reception responses including the Acks/Nacks of the CBGs 110 from the ACK/NACK generating unit 14. The PUCCH generating unit 16 determines whether or not the radio resource allocation requests are received depending on whether or not the radio resource allocation requests are obtained from the SR generating unit 15 (step S403).

In a case where there is the radio resource allocation requests (step S403: Yes), the PUCCH generating unit 16 specifies the number of Nacks included in each of the resource blocks 301 to 303 of the radio resources 220 in the normal allocation state (step S404).

The PUCCH generating unit 16 determines the non-transmission resource block in descending order of the number of Nacks (step S405).

The PUCCH generating unit 16 allocates the resource blocks 302 and 303 other than the non-use resource block to the reception responses except for the Ack/Nack which is allocated to the non-transmission resource block and is not transmitted in the normal allocation state (step S406).

In contrast, in a case where there are no radio resource allocation requests (step S403: No), the PUCCH generating unit 16 performs modulation and coding on the obtained reception responses, and allocates all the normal radio resources to the generated reception responses (step S407).

Thereafter, the PUCCH generating unit 16 maps the modulated and coded signals to the PUCCH according to the allocation of the radio resources (step S408). The PUCCH generating unit 16 outputs the modulated and coded signals to the wireless unit 11.

The wireless unit 11 receives the modulated and coded signals from the PUCCH generating unit 16. The wireless unit 11 performs DA conversion on the modulated and coded signals, and transmits the converted signals to the terminal apparatus 1 through the antenna (step S409).

As described above, the terminal apparatus according to the present embodiment transmits the radio resource allocation requests by using the normal radio resources, and transmits the reception responses by using the resource block having a larger number of Nacks among the reception responses as the non-use resource block. Accordingly, it is possible to efficiently transmit the feedback information items of the Acks/Nacks or the information items including the radio resource allocation requests. It is possible to reduce the transmission power.

Although it has been described that the transmission power is reduced at the time of the simultaneous transmission of the radio resource allocation requests and the reception responses, a case where the transmission power is reduced at the time of simultaneous transmission of the radio resource allocation requests and other signals may be realized by using the aforementioned method as in Embodiment 5. For example, in a case where there are high-priority reception responses for the URLLC and low-priority reception responses for the EMBB as the reception responses, it is possible to reduce the transmission power by using the aforementioned method.

For example, the PUCCH generating unit 16 allocates the normal radio resources to the reception responses for the URLLC, similarly to the aforementioned radio resource allocation requests. The PUCCH generating unit 16 uses the resource block having a large number of Nacks among the resource blocks to be allocated to the reception responses for the EMBB as the non-transmission resource block, similarly to the reception responses. Accordingly, the PUCCH generating unit 16 may reduce the number of bits to be used for the reception responses for the EMBB, and may reduce the transmission power. The PUCCH generating unit 16 may allocate the reduced power to the reception responses for the URLLC, and may improve the reliability of the reception responses for the URLLC.

The same method may be used for the simultaneous transmission of the radio resource allocation requests, the reception responses for the URLLC, and the reception responses for the EMBB.

Embodiment 8

Next, Embodiment 8 will be described. A terminal apparatus according to the present embodiment is different from Embodiments 1 to 7 in that different kinds of radio resource allocation requests are simultaneously transmitted. The terminal apparatus according to the present embodiment is also illustrated in the block diagram of FIG. 1. In the following description, the functions of the same units as those in the aforementioned embodiments will not be described.

Figure 26:
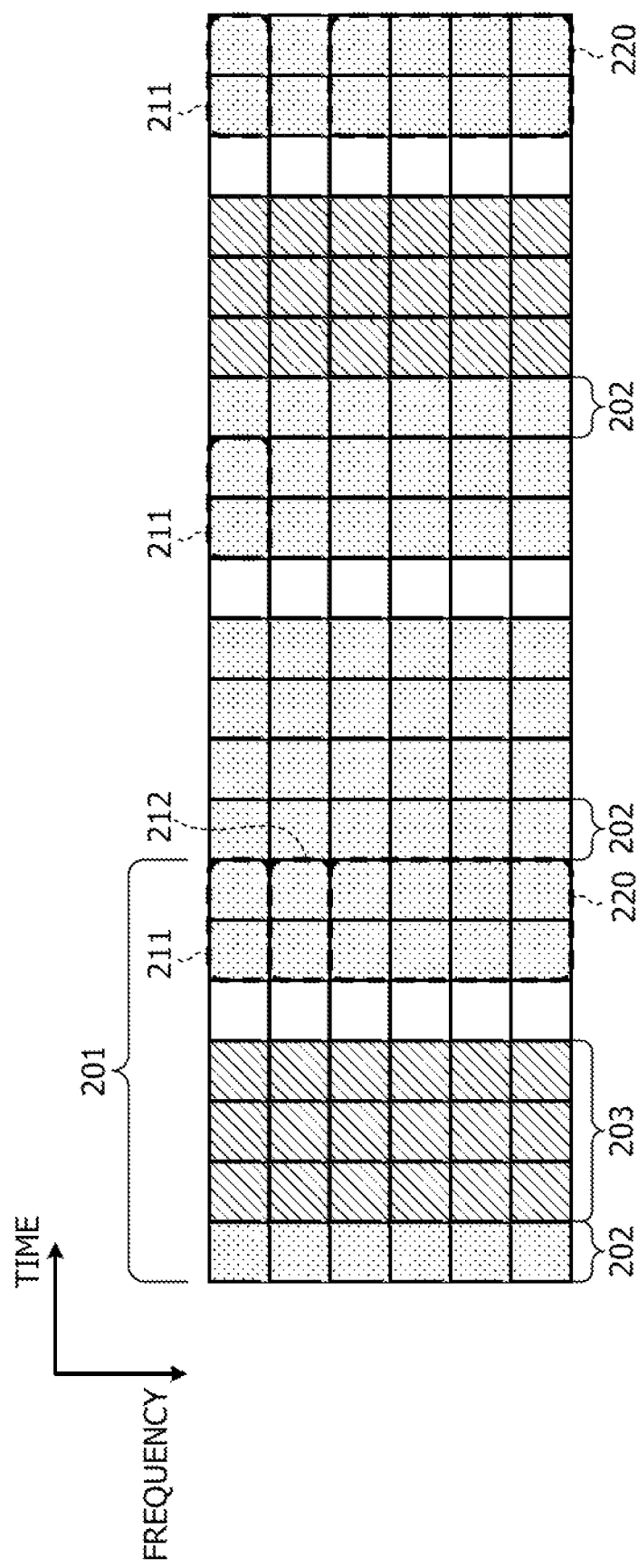
FIG. 26 illustrates the allocation of radio resources to different kinds of radio resource allocation requests according to Embodiment 8.

FIG. 26 illustrates the allocation of the radio resources to the different kinds of radio resource allocation requests according to Embodiment 8. In FIG. 26, a vertical direction represents frequency, and a horizontal direction represents time. The radio resources 211 and the radio resources 212 are respectively allocated to the different kinds of radio resource allocation requests. In a case where the different kinds of radio resource allocation requests are simultaneously transmitted at the same timing, the radio resources 211 and the radio resources 212 overlap each other in the time direction. In a case where the different kinds of radio resource allocation requests and the reception responses are transmitted at the same timing, the radio resources 211, the radio resources 212, and the radio resources 220 overlap each other in the time direction. Thus, the transmission power increases in the case of the simultaneous transmission. Accordingly, the terminal apparatus 1 according to the present embodiment reduces the transmission power by the following method.

A case where the terminal apparatus 1 has the same functions as those in any of Embodiments 1 to 4 will be described. The PUCCH generating unit 16 according to the present embodiment obtains radio resource allocation requests of the transmission data items stored in the first buffer 181 and the second buffer 182 from the SR generating unit 15. For example, the PUCCH generating unit 16 obtains high-priority radio resource allocation requests and low-priority radio resource allocation requests.

In the case of the simultaneous transmission, the PUCCH generating unit 16 displays the transmission of the low-priority radio resource allocation requests of the transmission data items stored in the second buffer 182 to the next transmission opportunity. The simultaneous transmission of the reception responses and the high-priority radio resource allocation requests of the transmission data items stored in the first buffer 181 is performed by any method of Embodiments 1 to 3.

In a case where any of the high-priority radio resource allocation requests and the low-priority radio resource allocation requests is obtained, the PUCCH generating unit 16 performs the simultaneous transmission of the radio resource allocation requests and the reception responses by using any method of Embodiments 1 to 3.

A case where the terminal apparatus 1 has the same functions as those in any of Embodiments 5 to 7 will be described. The PUCCH generating unit 16 according to the present embodiment obtains radio resource allocation requests of the transmission data items stored in the first buffer 181 and the second buffer 182 from the SR generating unit 15.

In the case of the simultaneous transmission, the PUCCH generating unit 16 displays the transmission of the low-priority radio resource allocation requests of the transmission data items stored in the second buffer 182 to the next transmission opportunity. The simultaneous transmission of the high-priority radio resource allocation requests of the transmission data items stored in the first buffer 181 and the reception responses is performed by any method of Embodiments 1 to 3.

In a case where there are no low-priority radio resource allocation requests and the high-priority radio resource allocation requests are obtained, the PUCCH generating unit 16 performs the simultaneous transmission of the radio resource allocation requests and the reception responses by using any method of Embodiments 5 to 7. In contrast, in a case where there are no high-priority radio resource allocation requests and the low-priority radio resource allocation requests are obtained, the PUCCH generating unit 16 delays the transmission of the low-priority radio resource allocation requests to the next transmission opportunity. The PUCCH generating unit 16 allocates the normal radio resources to the reception responses.

As described above, in a case where the different kinds of radio resource allocation requests are simultaneously generated, the terminal apparatus according to the present embodiment reduces power consumption by any method described in Embodiments 1 to 7 by delaying the transmission of the low-priority radio resource allocation requests. Accordingly, the terminal apparatus that uses different kinds of radio resource allocation requests may also efficiently transmit the feedback information items of the Acks/Nacks or the information items including the radio resource allocation requests. It is possible to reduce the transmission power.

Embodiment 9

Next, Embodiment 9 will be described. A terminal apparatus according to the present embodiment is different from Embodiment 1 in that the different kinds of radio resource allocation requests are used and the kind of the radio resource allocation requests is notified according to the pattern of the radio resources used in the PUCCH. The terminal apparatus according to the present embodiment is also illustrated in the block diagram of FIG. 1. In the following description, the functions of the same units as those in the embodiments will not be described.

The PUCCH generating unit 16 according to the present embodiment obtains the radio resource allocation requests of the transmission data items stored in the first buffer 181 or the second buffer 182 from the SR generating unit 15.

Figure 27:
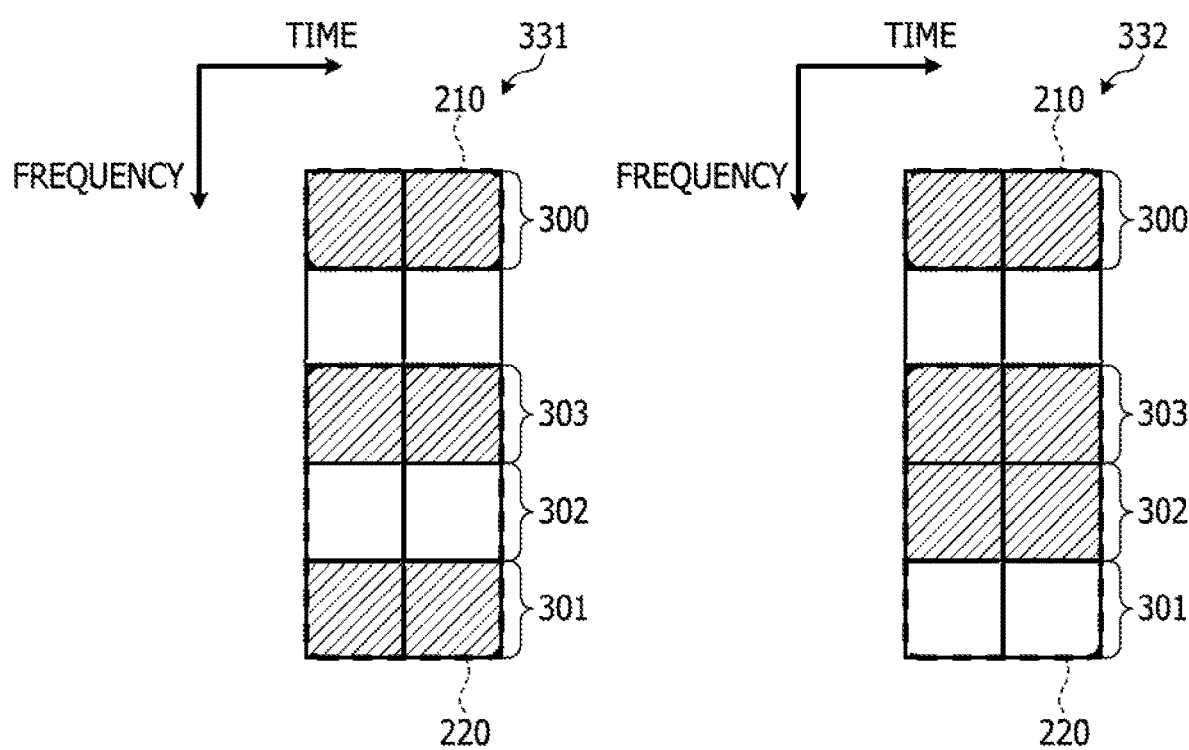
FIG. 27 illustrates the allocation of radio resources using a terminal apparatus according to Embodiment 9.

In a case where the high-priority radio resource allocation requests are obtained, the PUCCH generating unit 16 uses the resource block 302 as non-use resources, as represented in an allocation state 331 of FIG. 27. The resource blocks 300, 301, and 303 are allocated to the reception responses. FIG. 27 illustrates the allocation of the radio resources using the terminal apparatus according to Embodiment 9. In this case, when the radio resource allocation requests and the reception responses are not simultaneously transmitted, the PUCCH generating unit 16 configures a transmission power density higher than a transmission power density in a case where the reception responses are transmitted.

In a case where the low-priority radio resource allocation requests are obtained, the PUCCH generating unit 16 uses the resource block 301 as the non-use resources as represented in an allocation state 332 of FIG. 27. The resource blocks 300, 302, and 303 are allocated to the reception responses. In this case, when the radio resource allocation requests and the reception responses are not simultaneously transmitted, the PUCCH generating unit 16 configures the same transmission power density as the transmission power density in a case where the reception responses are transmitted.

The uplink signal baseband processing unit 25 of the base station apparatus 2 receives the signals transmitted from the terminal apparatus 1. The uplink signal baseband processing unit 25 of the base station apparatus 2 obtains the reception responses in the PUCCH of the reception signals, and obtains the Acks/Nacks of the CBGs 110. The uplink signal baseband processing unit 25 checks the resource blocks used in the transmission of the reception responses in the PUCCH. In a case where the resource block 302 is the non-use resource block, the uplink signal baseband processing unit 25 determines that the high-priority radio resources are generated. In a case where the resource block 301 is the non-use resource block, the uplink signal baseband processing unit 25 determines that the low-priority radio resources are generated.

As described above, the terminal apparatus according to the present embodiment notifies of the radio resource allocation requests according to the pattern of the use resource blocks in the PUCCH. Accordingly, it is possible to efficiently transmit the feedback information items of the Acks/Nacks or the information items including the radio resource allocation requests.

Embodiment 10

Next, Embodiment 10 will be described. A terminal apparatus according to the present embodiment uses different kinds of radio resource allocation requests, and uses the functions while switching between the functions of Embodiment 1 and the functions of Embodiment 2 according to the kind of the radio resource allocation requests. The terminal apparatus according to the present embodiment is also illustrated in the block diagram of FIG. 1. In the following description, the functions of the same units as those in the embodiments will not be described.

The PUCCH generating unit 16 according to the present embodiment obtains the radio resource allocation requests of the transmission data items stored in the first buffer 181 or the second buffer 182 from the SR generating unit 15.

The PUCCH generating unit 16 uses the functions of Embodiment 2 in a case where the high-priority radio resource allocation requests are obtained. For example, the PUCCH generating unit 16 classifies the CBGs 110 into the direct notification CBGs 401 and the indirect notification CBGs 402. The PUCCH generating unit 16 allocates some of the radio resources 210 and the radio resources 220 to the reception responses indicating the Acks/Nacks of the direct notification CBGs 401 so as to represent the Acks/Nacks of the indirect notification CBGs 402. In this case, when the radio resource allocation requests and the reception responses are not simultaneously transmitted, the PUCCH generating unit 16 configures the transmission power density higher than the transmission power density in a case where the reception responses are transmitted.

The PUCCH generating unit 16 uses the functions of Embodiment 1 in a case where the low-priority radio resource allocation requests are obtained. For example, the PUCCH generating unit 16 allocates some of the radio resources 210 and the radio resources 220 to the reception responses indicating the Acks/Nacks of the CBGs 110. In this case, when the radio resource allocation requests and the reception responses are not simultaneously transmitted, the PUCCH generating unit 16 configures the same transmission power density as the transmission power density in a case where the reception responses are transmitted.

As described above, the terminal apparatus according to the present embodiment changes the allocation method of the radio resources depending on the kind of the radio resource allocation requests. Accordingly, it is possible to efficiently transmit the feedback information of the Ack/Nack or the information including the radio resource allocation requests.

Embodiment 11

Figure 28:
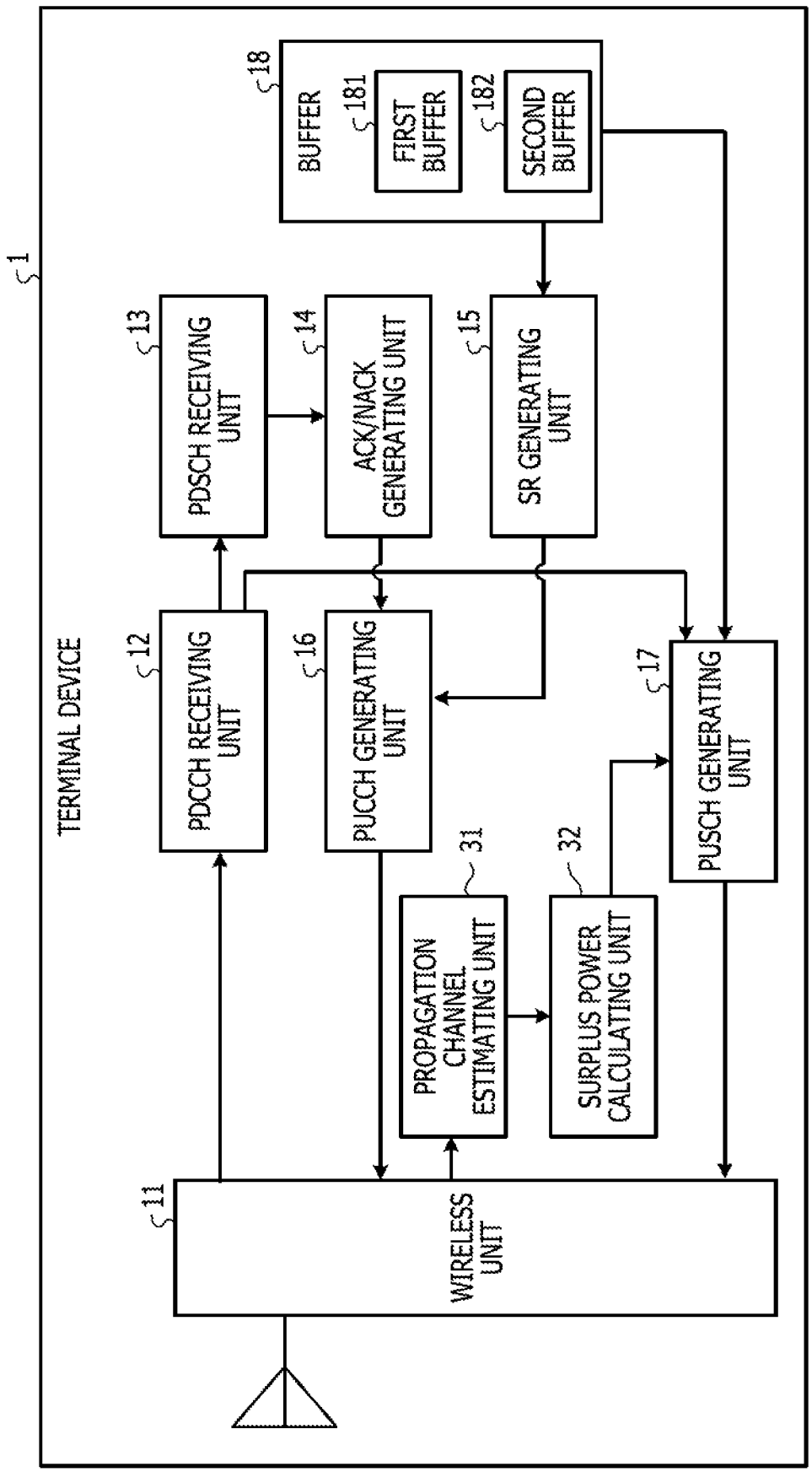
FIG. 28 is a block diagram of a terminal apparatus according to Embodiment 11.

Next, Embodiment 11 will be described. A terminal apparatus according to the present embodiment switches the methods of transmitting the radio resource allocation requests and the reception responses depending on the transmission power. FIG. 28 is a block diagram of the terminal apparatus according to Embodiment 11. In the following description, the functions of the same units as those in the embodiments will not be described.

The terminal apparatus 1 according to the present embodiment includes a propagation channel estimating unit 31 and a surplus power calculating unit 32. The propagation channel estimating unit 31 estimates received power from the amplitude of the signals transmitted from the base station apparatus 2. The propagation channel estimating unit 31 outputs information of the received power to the surplus power calculating unit 32.

The surplus power calculating unit 32 obtains the information of the received power from the propagation channel estimating unit 31. The surplus power calculating unit 32 subtracts the received power from the transmission power used by the base station apparatus 2, and calculates propagation loss. Subsequently, the surplus power calculating unit 32 calculates transmission power to be used for achieving reliability to be guaranteed for the Ack/Nack from surplus power. The surplus power calculating unit 32 notifies the PUSCH generating unit 17 of information of the transmission power to be used for achieving the reliability to be guaranteed for the Ack/Nack.

The PUSCH generating unit 17 obtains the information of the transmission power to be used for achieving the reliability to be guaranteed for the Ack/Nack from the surplus power calculating unit 32. The PUSCH generating unit 17 transmits the information of the transmission power to be used for achieving the reliability to be guaranteed for the Ack/Nack to the base station apparatus 2.

The PUCCH generating unit 16 determines which one of the methods of Embodiments 1 to 7 to be used in the transmission of the radio resource allocation requests and the reception responses depending on the transmission power. The PUCCH generating unit 16 transmits the radio resource allocation requests and the reception responses by using the determined method.

The base station apparatus 2 according to the present embodiment is also illustrated in the block diagram of FIG. 8. The uplink signal baseband processing unit 25 receives the information of the transmission power to be used for achieving the reliability to be guaranteed for the Ack/Nack from the terminal apparatus 1.

The uplink signal baseband processing unit 25 specifies the method of transmitting the radio resource allocation requests and the reception responses to be used by the terminal apparatus 1 depending on the information of the received transmission power. The uplink signal baseband processing unit 25 receives the radio resource allocation requests and the reception responses by using the specified method.

As described above, the terminal apparatus and the base station apparatus according to the present embodiment perform the transmission and the reception while switching the methods of transmitting the radio resource allocation requests and the reception responses depending on the information of the received transmission power. Accordingly, it is possible to efficiently transmit the feedback information items of the Acks/Nacks or the information items of the radio resource allocation requests.

Although the feedback of the Ack/Nack using the CBGs 110 has been described, it is possible to efficiently transmit the information items by using the functions of the aforementioned embodiments even in the case of the feedback of the Ack/Nack using another method as long as the simultaneous transmission occurs.

Figure 29:
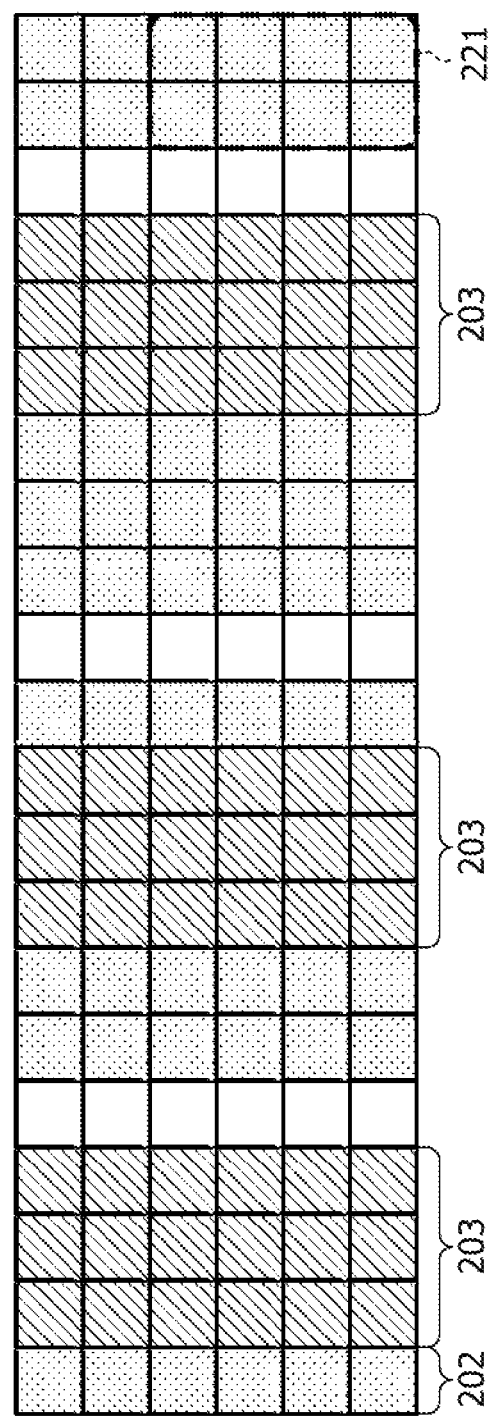
FIG. 29 illustrates the allocation of radio resources in a case where Acks/Nacks of signals in different TTIs are aggregated and the aggregated Acks/Nacks are transmitted at the same timing.

For example, as illustrated as FIG. 29, the functions of the aforementioned embodiments may be also used in a case where the Acks/Nacks of the signals transmitted in the PDSCH 203 in different TTIs are aggregated in radio resources 221 and the aggregated Acks/Nacks are transmitted at the same timing. FIG. 29 illustrates the allocation of the radio resources in a case where the Acks/Nacks of the signals in different TTIs are aggregated and the aggregated Acks/Nacks are transmitted at the same timing.

In this case, it is also desirable that the signals are efficiently transmitted at the time of the simultaneous transmission. For example, in a case where the radio resource allocation requests are generated at the same timing as the timing of the radio resources 221, the terminal apparatus 1 transmits the radio resource allocation requests and the reception responses by using the functions of any of Embodiments 1 to 7.

In addition, in a case where communication using carrier aggregation (CA) is performed, it is considered that Acks/Nacks of primary (P) cells and secondary (S) cells are transmitted at the same timing.

In this case, it is also desirable that the signals are efficiently transmitted at the time of the simultaneous transmission. For example, in a case where the radio resource allocation requests are generated at the same timing as the timing of the Acks/Nacks of the P cells and the S cells, the terminal apparatus 1 transmits the radio resource allocation requests and the reception responses by using the functions of any of Embodiments 1 to 7.

(Hardware Structure)

Figure 30:
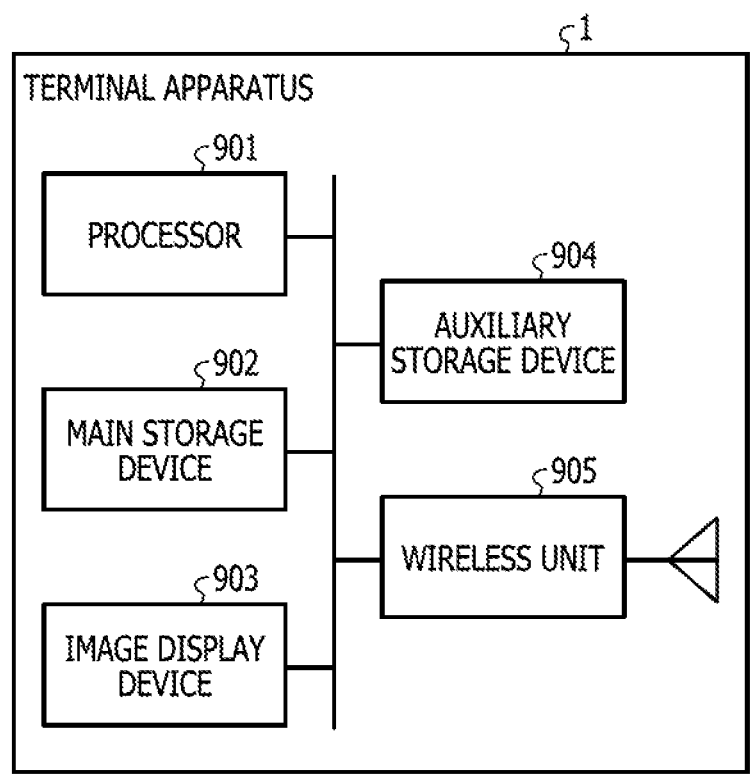
FIG. 30 is a hardware structure diagram of the terminal apparatus according to each embodiment.

Next, a hardware structure of the terminal apparatus 1 will be described with reference to FIG. 30. FIG. 30 is a hardware structure diagram of the terminal apparatus according to each embodiment. The terminal apparatus 1 includes a processor 901, a main storage device 902, an image display device 903, an auxiliary storage device 904, and a wireless device 905.

The processor 901 is connected to the main storage device 902, the image display device 903, the auxiliary storage device 904, and the wireless device 905 through a bus. The wireless device 905 is connected to the antenna.

The image display device 903 is, for example, a liquid crystal display. The image display device 903 displays the data items transmitted from the base station apparatus 2, and provides the displayed data items to a manipulator.

The auxiliary storage device 904 stores various programs including a program for realizing the functions of the PDCCH receiving unit 12, the PDSCH receiving unit 13, the ACK/NACK generating unit 14, the PUCCH generating unit 16, and the PUSCH generating unit 17 illustrated as FIG. 1. The auxiliary storage device 904 stores various programs including a program for realizing the functions of the propagation channel estimating unit 31 and the surplus power calculating unit 32.

The processor 901 reads out the various programs stored in the auxiliary storage device 904, loads the readout programs into the main storage device 902, and executes the programs. Accordingly, the processor 901 realizes the functions of the PDCCH receiving unit 12, the PDSCH receiving unit 13, the ACK/NACK generating unit 14, the PUCCH generating unit 16, and the PUSCH generating unit 17 illustrated as FIG. 1. The processor 901 stores various programs including a program for realizing the functions of the propagation channel estimating unit 31 and the surplus power calculating unit 32.

The wireless device 905 realizes the function of the wireless unit 11. The wireless device 905 wirelessly communicates with the base station apparatus 2 through the antenna.

Figure 31:
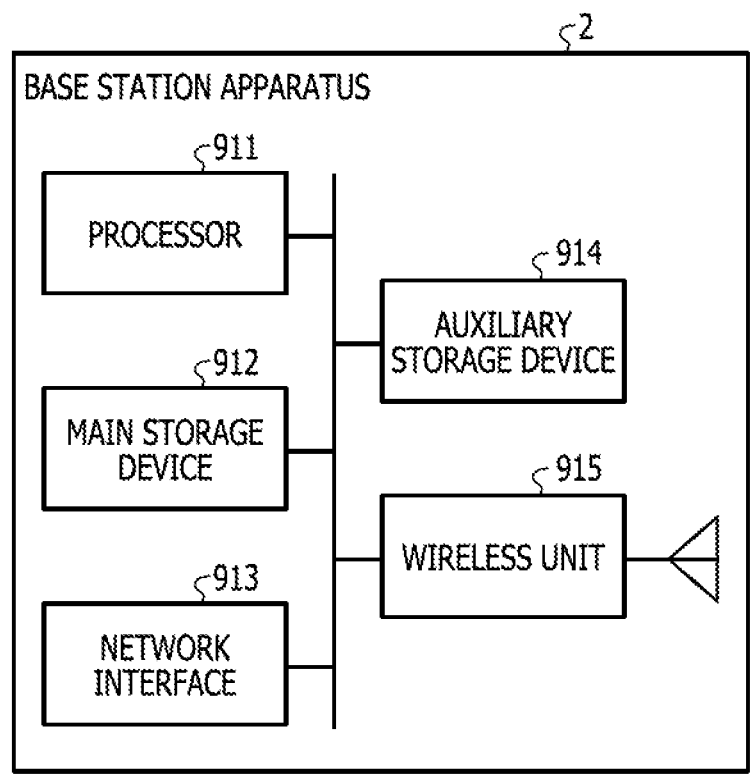
FIG. 31 is a hardware structure diagram of the base station apparatus according to each embodiment.

Next, a hardware structure of the base station apparatus 2 will be described with reference to FIG. 31. FIG. 31 is a hardware structure diagram of the base station apparatus according to each embodiment. The base station apparatus 2 includes a processor 911, a main storage device 912, a network interface 913, an auxiliary storage device 914, and a wireless device 915.

The processor 911 is connected to the main storage device 912, the network interface 913, the auxiliary storage device 914, and the wireless device 915 through a bus. The wireless device 915 is connected to the antenna.

The network interface 913 is an interface to be used for communicating with a higher device. The main storage device 912 realizes the function of the buffer 22 illustrated as FIG. 8.

The auxiliary storage device 914 stores various programs including a program for realizing the functions of the PUCCH resource managing unit 21, the scheduler 23, the downlink signal baseband processing unit 24, and the uplink signal baseband processing unit 25 illustrated as FIG. 8.

The processor 911 reads out the various programs stored in the auxiliary storage device 914, loads the readout programs on the main storage device 912, and executes the programs. Accordingly, the processor 911 realizes the functions of the PUCCH resource managing unit 21, the scheduler 23, the downlink signal baseband processing unit 24, and the uplink signal baseband processing unit 25 illustrated as FIG. 8.

The wireless device 915 realizes the function of the wireless unit 26. The wireless device 915 wirelessly communicates with the terminal apparatus 1 through the antenna.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal apparatus comprising:
a receiver configured to receive a radio signal;
processor circuitry configured to generate a response signal to respond to the received radio signal; and
a transmitter configured to transmit a plurality of types of signals including the generated response signal,
wherein the transmitter is configured to change a size of a radio resource to be used for transmitting the generated response signal while maintaining a format for transmitting the generated response signal between when the generated response signal is transmitted on one physical uplink control channel resource (PUCCH) and when the plurality of types of signals including the generated response signal are transmitted on the one PUCCH resource.

2. The terminal apparatus of claim 1, wherein the processor circuitry is further configured to generate a radio resource allocation request for transmitting specific signals,
wherein the transmitter changes the size of the radio resource to be used for transmitting the response signal between a case where the response signal and the radio resource allocation request are transmitted on the PUCCH resource and a case where the radio resource allocation request is not transmitted and the response signal is transmitted.

3. The terminal apparatus of claim 2, wherein when the response signal and the radio resource allocation request are transmitted at the same timing, the transmitter transmits the response signal and the radio resource allocation request by using some radio resources allocated to the transmission of the response signal and the radio resource allocation request.

4. The terminal apparatus of claim 3, wherein the transmitter transmits some response signals by using the radio resources allocated to the radio resource allocation request.

5. The terminal apparatus of claim 2, wherein the transmitter notifies of the generation of the radio resource allocation request by recognizing that some radio resources allocated to the response signals are not transmitted.

6. The terminal apparatus of claim 2, wherein the transmitter is configured to:
transmit the radio resource allocation request by using radio resources allocated to the radio resource allocation request, and
transmit response signals by using some radio resources allocated to the response signal.

7. The terminal apparatus of claim 2, wherein the receiver receives the radio signal and a plurality of first groups including data items each having a predetermined size, and
the processor circuitry generates response signals for each of second groups obtained by combining the first groups.

8. The terminal apparatus of claim 2, wherein the transmitter has a parameter for adjusting transmission power density for each kind of radio resource allocation request, and changes the parameter at the time of transmitting the radio resource allocation request and the response signal depending on the kind of the radio resource allocation request.

9. The terminal apparatus of claim 1, wherein the transmitter is configured to transmit the generated response signal by using resource blocks comprised of a plurality of subcarriers, and
wherein one or more reference signals are mapped in one or more subcarriers of the plurality of subcarriers.

10. The terminal apparatus of claim 9, wherein four reference signals are mapped in each resource block.

11. A wireless communication method, comprising:
receiving a radio signal;
generating a response signal to respond to the received radio signal; and
transmitting a plurality of types of signals including the generated response signal,
wherein the transmitter is configured to change a size of a radio resource to be used for transmitting the generated response signal while maintaining a format for transmitting the generated response signal between when the generated response signal is transmitted on one physical uplink control channel resource (PUCCH) and when the plurality of types of signals including the generated response signal are transmitted on the PUCCH resource.

12. The wireless communication method of claim 11, wherein the method is implemented in a terminal apparatus.

13. The wireless communication method of claim 11, further comprising:
generating a radio resource allocation request for transmitting specific signals, and
changing the size of the radio resource to be used for transmitting the response signal between a case where the response signal and the radio resource allocation request are transmitted on the PUCCH resource and a case where the radio resource allocation request is not transmitted and the response signal is transmitted.

14. The wireless communication method of claim 11, further comprising transmitting the generated response signal by using resource blocks comprised of a plurality of subcarriers,
wherein one or more reference signals are mapped in one or more subcarriers of the plurality of subcarriers.

15. A base station apparatus, comprising:
a receiver configured to receive a radio signal;
processor circuitry configured to generate a response signal to respond to the received radio signal; and
a transmitter configured to transmit a plurality of types of signals including the generated response signal,
wherein the transmitting is configured to change a size of a radio resource to be used for transmitting the generated response signal while maintaining a format for transmitting the generated response signal between when the generated response signal is transmitted on one physical uplink control channel resource (PUCCH) and when the plurality of types of signals including the generated response signal are transmitted on the one physical PUCCH resource.

16. The base station apparatus of claim 15, wherein the receiver is further configured to receive a radio resource allocation request for specific signals, and
wherein the transmitter changes the size of the radio resource to be used for transmitting the response signal between a case where the response signal and the radio resource allocation request are transmitted on the PDCCH resource and a case where the radio resource allocation request is not transmitted and the response signal is transmitted.

17. The base station apparatus of claim 15, wherein the transmitter is configured to transmit the generated response signal by using resource blocks comprised of a plurality of subcarriers, and
wherein one or more reference signals are mapped in one or more subcarriers of the plurality of subcarriers.

18. A wireless communication method, comprising:
receiving a radio signal;
generating a response signal to respond to the received radio signal; and
transmitting a plurality of types of signals including the generated response signal,
wherein the transmitting is configured to change a size of a radio resource to be used for transmitting the generated response signal while maintaining a format for transmitting the generated response signal between when the generated response signal is transmitted on one physical uplink control channel resource (PUCCH) and when the plurality of types of signals including the generated response signal are transmitted on the one PDCCH resource.

19. The wireless communication method of claim 18, wherein the method is implemented in a base station apparatus.

20. The wireless communication method of claim 18, further comprising:
receiving a radio resource allocation request for specific signals, and
changing the size of the radio resource to be used for transmitting the response signal between a case where the response signal and the radio resource allocation request are transmitted on the PDCCH resource and a case where the radio resource allocation request is not transmitted and the response signal is transmitted.

21. The wireless communication method of claim 18, further comprising
transmitting the generated response signal by using resource blocks comprised of a plurality of subcarriers,
wherein one or more reference signals are mapped in one or more subcarriers of the plurality of subcarriers.

* * * * *